US010922628B2

(12) United States Patent
Yoo et al.

(10) Patent No.: US 10,922,628 B2
(45) Date of Patent: Feb. 16, 2021

(54) METHOD AND APPARATUS FOR MACHINE LEARNING

(71) Applicant: Lunit Inc., Seoul (KR)

(72) Inventors: Dong Geun Yoo, Seoul (KR); Kyung Hyun Paeng, Busan (KR); Sung Gyun Park, Icheon-si (KR)

(73) Assignee: LUNIT INC., Seoul (KR)

( * ) Notice: Subject to any disclaimer, the term of this patent is extended or adjusted under 35 U.S.C. 154(b) by 0 days.

(21) Appl. No.: 16/684,627

(22) Filed: Nov. 15, 2019

(65) Prior Publication Data

US 2020/0151613 A1 May 14, 2020

Related U.S. Application Data

(63) Continuation of application No. PCT/KR2018/013667, filed on Nov. 9, 2018.

(51) Int. Cl.
*G06N 20/00* (2019.01)
*G06N 20/20* (2019.01)
(Continued)

(52) U.S. Cl.
CPC ......... *G06N 20/20* (2019.01); *G06F 11/3466* (2013.01); *G06F 17/18* (2013.01)

(58) Field of Classification Search
CPC .... G06N 20/00; G06N 20/20; G06F 11/3466; G06F 17/18
(Continued)

(56) References Cited

U.S. PATENT DOCUMENTS 9,275,347 B1  3/2016 Harada et al.
2008/0250875 A1* 10/2008 Khosla ............. G01N 35/00871
                                                    73/863

(Continued)

FOREIGN PATENT DOCUMENTS

JP           6362893      7/2018
JP         2018-155522   10/2018
(Continued)

OTHER PUBLICATIONS

Fujita et al., "Data Analyzer", JP2018155522, Oct. 4, 2018. (Year: 2018).*

(Continued)

*Primary Examiner* — Dave Misir
(74) *Attorney, Agent, or Firm* — Lex IP Meister, PLLC

(57) ABSTRACT

A machine learning method that may reduce an annotation cost and may improve performance of a target model is provided. Some embodiments of the present disclosure may provide a machine learning method performed by a computing device, including: acquiring a training dataset of a first model including a plurality of data samples to which label information is not given; calculating a miss-prediction probability of the first model on the plurality of data samples; configuring a first data sample group by selecting at least one data sample from the plurality of data samples based on the calculated miss-prediction probability; acquiring first label information on the first data sample group; and performing first learning on the first model by using the first data sample group and the first label information.

18 Claims, 22 Drawing Sheets

(51) Int. Cl.
*G06F 11/34* (2006.01)
*G06F 17/18* (2006.01)

(58) Field of Classification Search
USPC .......................................................... 706/12
See application file for complete search history.

(56) References Cited

U.S. PATENT DOCUMENTS

| | | |
|---|---|---|
| 2015/0254555 A1 | 9/2015 | Williams, Jr. et al. |
| 2015/0269195 A1* | 9/2015 | Aisu ...................... G06N 20/00 706/12 |
| 2018/0240031 A1* | 8/2018 | Huszar .................. G06F 9/4416 |

FOREIGN PATENT DOCUMENTS

| | | |
|---|---|---|
| KR | 10-1828503 | 3/2018 |
| KR | 10-1895121 | 9/2018 |
| KR | 10-1908680 | 10/2018 |

OTHER PUBLICATIONS

Oscar Reyes et al., Effective active learning strategy for multi-label learning, Preprint submitted to Neurocomputing, Jun. 9, 2017.

Mehran Khodabandeh et al., Active Learning for Structured Prediction from Partially Labeled Data, arXiv:1706.02342[cs.CV], Jun. 9, 2017.

Shi, Yi, et al., Active Deep Learning Attacks under Strict Rate Limitations for Online API Calls, Presented at 2018 IEEE International Symposium on Technologies for Homeland Security (HST) on Oct. 23, 2018.

\* cited by examiner

METHOD AND APPARATUS FOR MACHINE LEARNING

CROSS-REFERENCE TO RELATED APPLICATION

This application is a continuation of PCT Application No. PCT/KR2018/013667 filed on Nov. 9, 2018, the entire contents of which are incorporated herein by reference.

BACKGROUND

(a) Field

The present disclosure relates to a machine learning method and apparatus. More specifically, the present disclosure relates to a method that may quickly construct a high-performance machine learning model while minimizing human and time costs required for annotation job, and to an apparatus for performing the method.

(b) Description of the Related Art

As shown in FIG. 1, supervised learning is a machine learning method to construct a target model 3 for performing a target task by learning a dataset 2 having label information (that is, correct answer information). Therefore, in order to perform the supervised learning on a dataset 1 which doesn't have label information (indicated by a tag icon), annotation job should precede.

The annotation means a job of tagging label information for each data to generate a training dataset. Since the annotation job was generally performed manually, a considerable amount of human cost and time cost is consumed for generating a large amount of training dataset. In particular, in case of building a machine learning model for detecting the location of lesions or determining the lesion types in medical images, the annotation job should be performed by a skilled practitioner, which is much more expensive than other domains.

In a field of machine learning, various researches have been conducted to reduce costs of annotating and to construct a high performance model with a small training dataset. For example, machine learning methods such as transfer learning, weakly supervised learning, and active learning are all parts of the study.

Among these, the active learning is a method for reducing the cost of annotating by selecting datasets that are difficult to classify among all datasets and performing learning on the selected datasets. In other words, the active learning may be referred to as a method for reducing annotation costs by annotating only selected data sets.

The process in which the active learning is performed is illustrated in FIG. 2. As shown in FIG. 2, the active learning starts by performing a first annotation job ① by randomly extracting a sample group 5 consisting of some data samples from a dataset 4 to which no label information is given, and then by performing a first learning operation ② of a target model 6 with respect to the sample group 5. Next, a sample group 7 that is difficult to classify is selected by performing uncertainty sampling ③ on an unlearned data sample among the dataset 4. When the uncertainty sampling is performed using the target model 6, an entropy value based on a confidence score for each class of the target model 6 is mainly used as a measure of uncertainty. Here, the data sample that are difficult to classify means a data sample in which the confidence score is evenly distributed for each class so that the entropy value is greater than or equal to a threshold. In addition, the annotation job ④ is performed only on the selected sample group 7, and a second learning operation ⑤ on the target model 6 is performed on a sample group 8 in which the label information is obtained. In addition, the processes ③, ④, and ⑤ are repeated until the learning of the target model 6 is completed.

As described above, the active learning is a learning method that may reach target performance, without annotating all the data samples, by intensively learning only some data samples that are difficult to classify at the point of the view of the model.

However, the above-described active learning method has various problems. First, the most fundamental problem is that the entropy value, which is the basis for uncertainty sampling, is calculated based on the confidence score of the target model. In other words, since accuracy of the entropy value is not high until the target model has been sufficiently learned, the data sample that is difficult to classify cannot be accurately selected. Due to this problem, during the active learning, the performance of the target model is slowly enhanced, and the annotation cost reduction is not significant.

Another problem is that an application scope of the active learning is greatly limited because the entropy is an indicator that may only be applied to a classification task. For example, the active learning based on an entropy value cannot be used to construct a machine learning model associated with a regression task.

Therefore, in order to expand the application scope of the active learning and to accurately select the data sample that is effective for learning to maximize the effect of reducing the annotation cost, a new method of active learning is required.

SUMMARY

Some embodiments of the present disclosure provide a machine learning method and an apparatus for performing the method that may reduce a human cost and a time cost required for an annotation job.

Some embodiments of the present disclosure provide a method and an apparatus for performing the method that may accurately select data sample being effective for learning.

Some embodiments of the present disclosure provide a method and an apparatus for performing the method that may extend a scope of application of active learning by utilizing a general sampling indicator rather than entropy.

It should be noted that objects of the present disclosure are not limited to the above-described objects, and other objects of the present disclosure will be apparent to those skilled in the art from the following descriptions.

Some embodiments of the present disclosure may provide a machine learning method performed by a computing device. The method may include: acquiring a training dataset of a first model including a plurality of data samples to which label information is not given; calculating a missprediction probability of the first model on the plurality of data samples; making a first data sample group by selecting at least one data sample from the plurality of data samples based on the calculated miss-prediction probability; acquiring first label information on the first data sample group; and performing first learning on the first model by using the first data sample group and the first label information.

In some embodiments, the first data sample group may consist of a data sample having the calculated miss-prediction probability being greater than or equal to a threshold.

In some embodiments, calculating the miss-prediction probability of the first model may include: constructing a second model for calculating the miss-prediction probability of the first model based on an evaluation result of the first model; and calculating a miss-prediction probability on each of the plurality of data samples by using the second model.

In some embodiments, constructing the second model may include: training the first model by using a first data sample given correct answer label information; evaluating the first model by using the first data sample; tagging the first data sample with label information based on the evaluated result; and learning the first data sample with the tagged label information to construct the second model.

In some embodiments, the tagged label information may be a prediction error of the first data sample.

In some embodiments, tagging the first data sample may include: tagging a first value with a label of the first data sample, in response to determining that the evaluation result is a false positive (FP) or a false negative (FN); and tagging a second value with a label of the first data sample, in response to determining that the evaluation result is a true positive (TP) or a true negative (TN).

In some embodiments, constructing the second model may include: training the first model by using a first data sample given correct answer label information; evaluating the trained first model by using a second data sample given correct answer label information; tagging the second data sample with label information based on the evaluated result; and learning the second data sample with the tagged label information to construct the second model.

In some embodiments, the method may further include: updating the second model by using an evaluated result of the first learned first model; selecting at least one data sample from unlearned data samples by using the updated second model to make a second data sample group; acquiring second label information on the second data sample group; and performing second learning on the first learned first model by using the second data sample group and the second label information.

In some embodiments, the method may further include: calculating a class-specific score on a first data sample included in the training dataset through the first model; calculating an entropy value on the first data sample based on the class-specific confidence score; and excluding the first data sample from the training dataset of the first model, in response to determining that the entropy value is less than a threshold.

In some embodiments, the first data sample group may consist of a data sample having the calculated miss-prediction probability being greater than or equal to a first threshold. And making of the first data sample group may include: selecting at least one of the plurality of data samples having the miss-prediction probability being less than a second threshold to make a second data sample group; and excluding the second data sample group from the training dataset of the first model.

In some embodiments, performing the first learning may include: providing sample weights of which at least some have different sample weights to respective data samples included in the first data sample group; and learning the first data sample group based on the sample weight. And a value of the sample weight may be determined based on the miss-prediction probability of each of the data samples.

In some embodiments, performing the first learning may include: generating a second data sample group from the first data sample group by applying a data augmentation method; and further learning the second data sample group to update the first model.

In some embodiments, the method may further include: making a second data sample group by selecting at least one data sample from data samples not used in the first learning based on the miss-prediction probability of the first learned first model; acquiring second label information on the second data sample group; and performing second learning on the first learned first model by using the second data sample group and the second label information.

Some embodiments of the present disclosure may provide a machine learning apparatus. The machine learning apparatus may include: a memory including one or more instructions; and a processor, by executing the one or more instructions, that acquires a training dataset of a first model including a plurality of data samples to which label information is not given, calculates a miss-prediction probability of the first model on the plurality of data samples, make a first data sample group by selecting at least one data sample from the plurality of data samples based on the calculated miss-prediction probability, acquires first label information on the first data sample group, and performs first learning on the first model by using the first data sample group and the first label information.

Some embodiments of the present disclosure may provide a computer program. The computer program may be combined with a computing device and may be stored in a computer readable recording medium so that acquiring a training dataset of a first model including a plurality of data samples to which label information is not given, calculating a miss-prediction probability of the first model on the plurality of data samples, making a first data sample group by selecting at least one data sample from the plurality of data samples based on the calculated miss-prediction probability, acquiring first label information on the first data sample group, and performing first learning on the first model by using the first data sample group and the first label information may be executed.

Some other embodiments of the present disclosure may provide machine learning method performed by a computing device. The method may include: acquiring a training dataset including a plurality of data samples to which label information is not given; acquiring first label information on a first data sample group included in the training dataset, and learning the first data sample group with the first label information to construct a first model; calculating a miss-prediction of the first model on remaining data samples except the first data sample group from the training dataset; selecting at least one data sample from the remaining data samples based on the miss-prediction probability to make a second data sample group; acquiring second label information on the second data sample group; and training a second model of an initialization state with the second data sample group and the second label information.

Some other embodiments of the present disclosure may provide a machine learning apparatus. The machine learning apparatus may include: a memory including one or more instructions; and a processor, by executing the one or more instructions, that acquires a training dataset including a plurality of data samples to which label information is not given, acquires first label information on a first data sample group included in the training dataset, learns the first data sample group with the first label information to construct a first model, calculates a miss-prediction of the first model on remaining data samples except the first data sample group from the training dataset, selects at least one data sample from the remaining data samples based on the miss-prediction probability to make a second data sample group, acquires second label information on the second data sample group, and trains a second model of an initialization state with the second data sample group and the second label information.

Some other embodiments of the present disclosure may provide a computer program. The computer program may be combined with a computing device and may be stored in a computer readable recording medium so that acquiring a training dataset including a plurality of data samples to which label information is not given, acquiring first label information on a first data sample group included in the training dataset, learning the first data sample group with the first label information to construct a first model, calculating a miss-prediction of the first model on the remaining data samples except the first data sample group from the training dataset, selecting at least one data sample from the remaining data samples based on the miss-prediction probability to configure a second data sample group, acquiring second label information on the second data sample group, and learning a second model of an initialization state with the second data sample group and the second label information may be executed.

According to various embodiments of the present disclosure described above, a data sample to be annotated is selected based on a miss-prediction probability of a target model. In other words, the data sample is not selected based on uncertainty, but the data sample that the target model is likely to be wrong is selected. Unlike the uncertainty, the miss-prediction probability is not dependent on a confidence score of the target model, thus the data sample may be selected more accurately.

In addition, since the target model intensively learns data samples to which the target model is likely to be wrong, the learning effect can be improved. That is, performance of the target model can quickly reach target performance. Accordingly, computing and time costs required for learning can be greatly reduced, and a cost required for annotation can also be significantly reduced.

In addition, since active learning is performed based on the miss-prediction probability of the target model without depending on an entropy value, an application range of the active learning can be greatly expanded.

Effects of the present disclosure are not limited to those mentioned above, and other effects which have not been mentioned can be clearly understood by those skilled in the art from the following description.

DETAILED DESCRIPTION OF THE EMBODIMENTS

Figure 1:
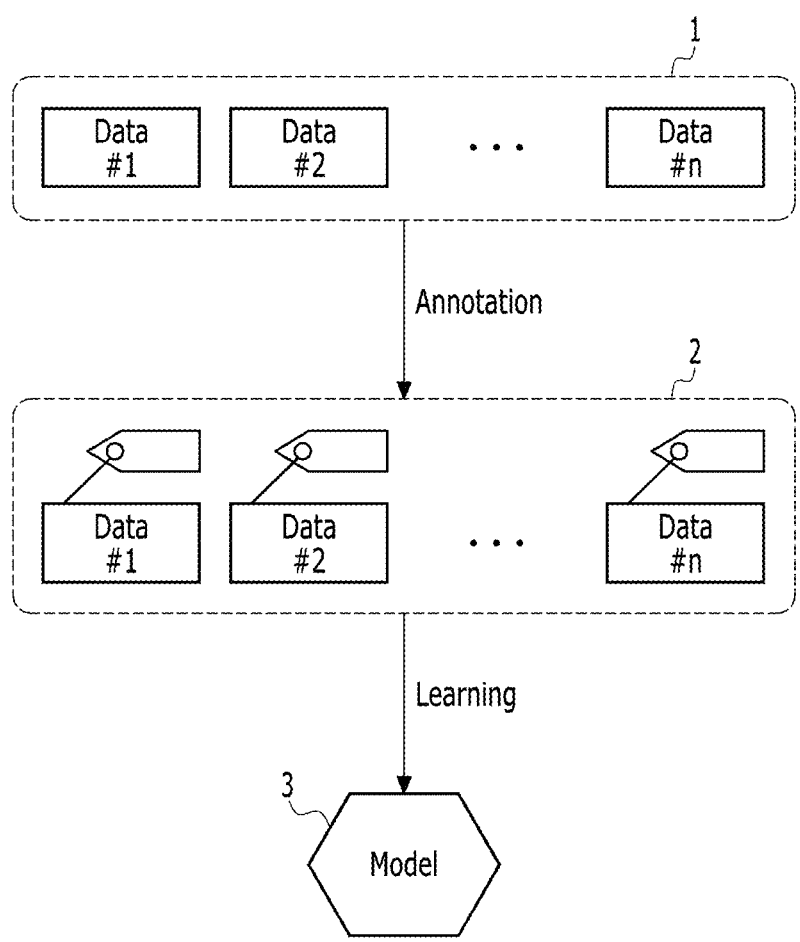
FIG. 1 is an exemplary diagram for explaining a relationship between supervised learning and an annotation job.
Figure 2:
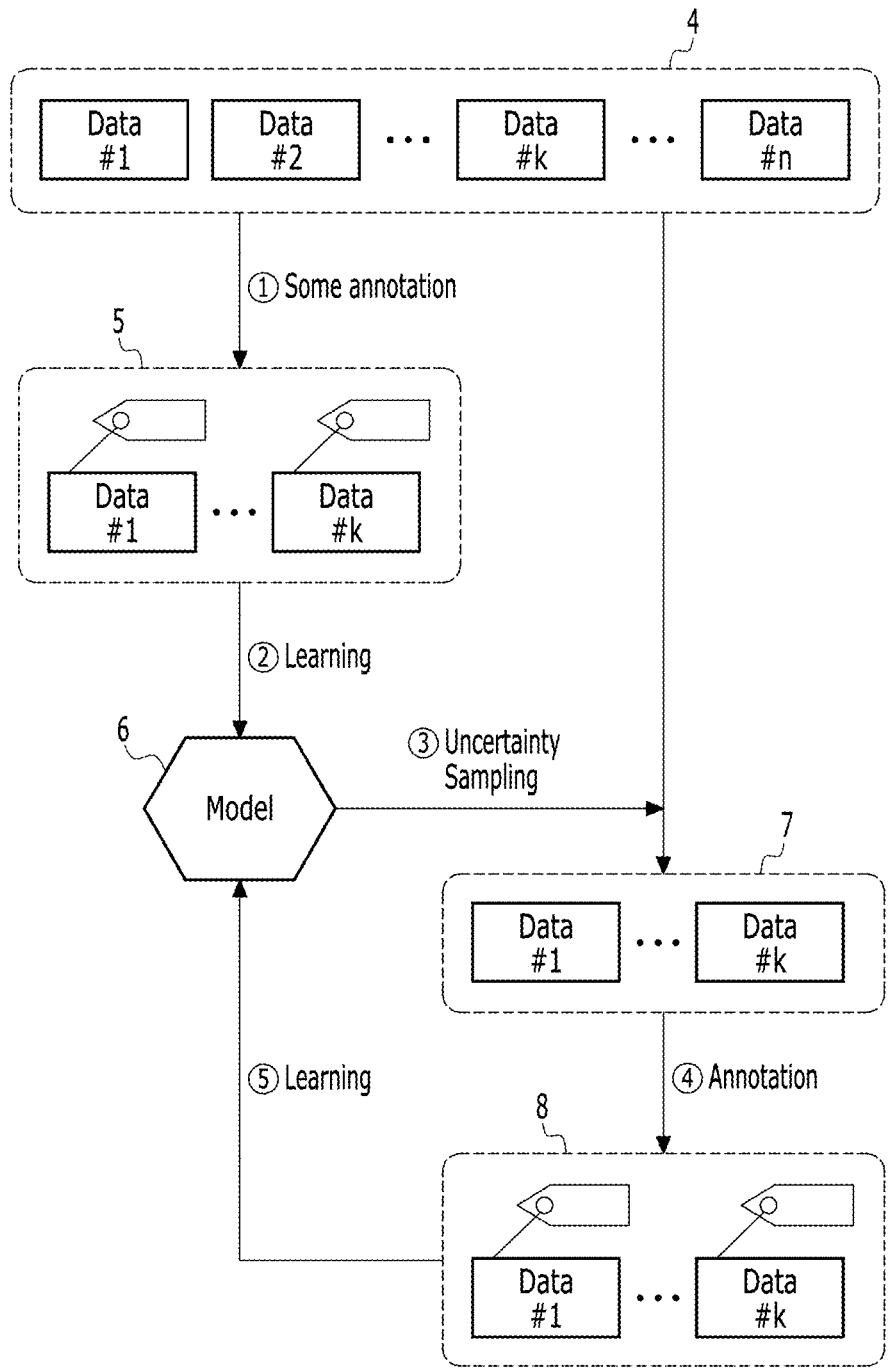
FIG. 2 is an exemplary diagram for explaining a conventional active learning method.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to the person of ordinary skill in the art, and the present disclosure will only be defined by the appended claims. Like reference numerals designate like elements throughout the specification.

In adding reference numerals to elements of each drawing, like reference numerals designate like elements throughout the specification. In describing the embodiments of the present disclosure, a detailed description of pertinent known constructions or functions will be omitted if it is deemed to make the gist of the present disclosure unnecessarily vague.

Unless otherwise defined, all terms (including technical and scientific terms) used herein have the same meaning as commonly understood by the person of ordinary skill in the art to which this disclosure belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms "a", "an" and "the" are intended to include the plural forms as well, unless the context clearly indicates otherwise.

It will be further understood that, although the terms first, second, A, B, (a), (b), and the like may be used herein to describe various elements, components, steps and/or operations. These terms are only used to distinguish one element, component, step or operation from another element, component, step, or operation. Thus, a first element, component, step or operation discussed below could be termed a second element, component, step or operation without departing from the teachings of the present inventive concept. It will be further understood that when an element is referred to as being "connected to" or "coupled with" another element, it can be directly connected or coupled with the other element or intervening elements may be present.

It will be further understood that the terms "comprise" or "comprising", "include" or "including", and "have" or "having" specify the presence of stated elements, steps, operations, and/or devices, but do not preclude the presence or addition of one or more other elements, steps, operations, and/or devices.

Before description of this specification, some terms used herein will be clarified.

In the present specification, the term "target model" is a model to perform a target task and is a model constructed through machine learning.

In the present specification, the term "label information" refers correct answer information of a data sample. The label information may generally be obtained through an annotation job.

In the present specification, the term "annotation" refers to a job for tagging label information to a data sample. Although the term "annotation" may be used as a label information itself, in order to avoid confusion of terms herein, the term "annotation" is used with the meaning defined above. The term "annotation" may be used interchangeably with terms such as tagging and labeling in the art.

In the present specification, the term "miss-prediction probability" refers to a probability or a possibility that a prediction result includes an error (that is, a probability that a prediction is incorrect), when a specific model for a given data sample performs prediction.

In the present specification, the term "instruction" refers to a series of instructions that are grouped by function and are executed by a processor or a component of a computer program.

Hereinafter, some embodiments of the present disclosure are described in detail with reference to the accompanying drawings.

Figure 3:
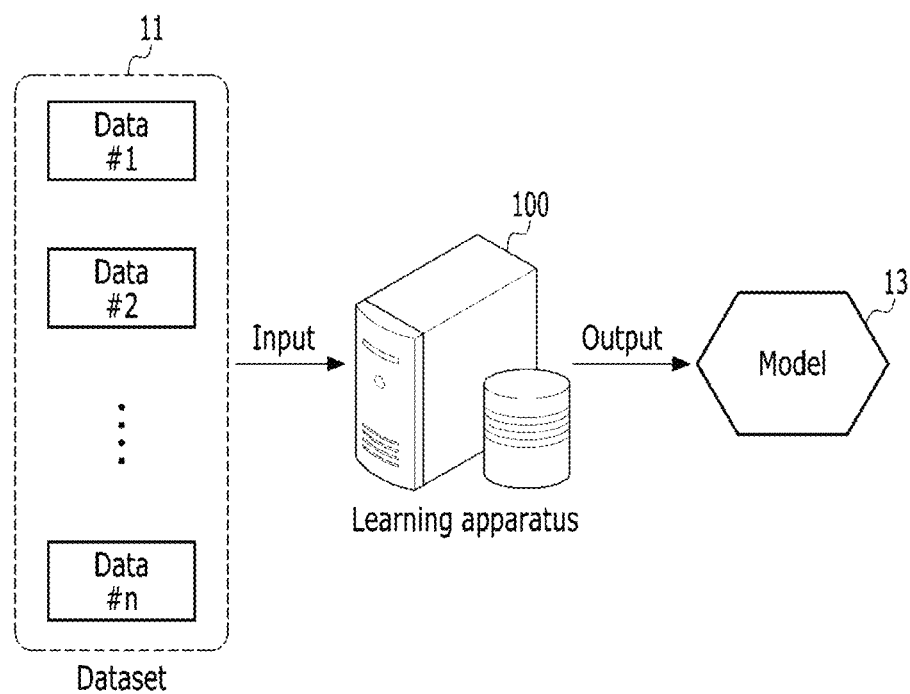
FIG. 3 and FIG. 4 are schematic diagrams for schematically explaining an operation and an input/output of a machine learning apparatus according to some embodiments of the present disclosure.
Figure 4:
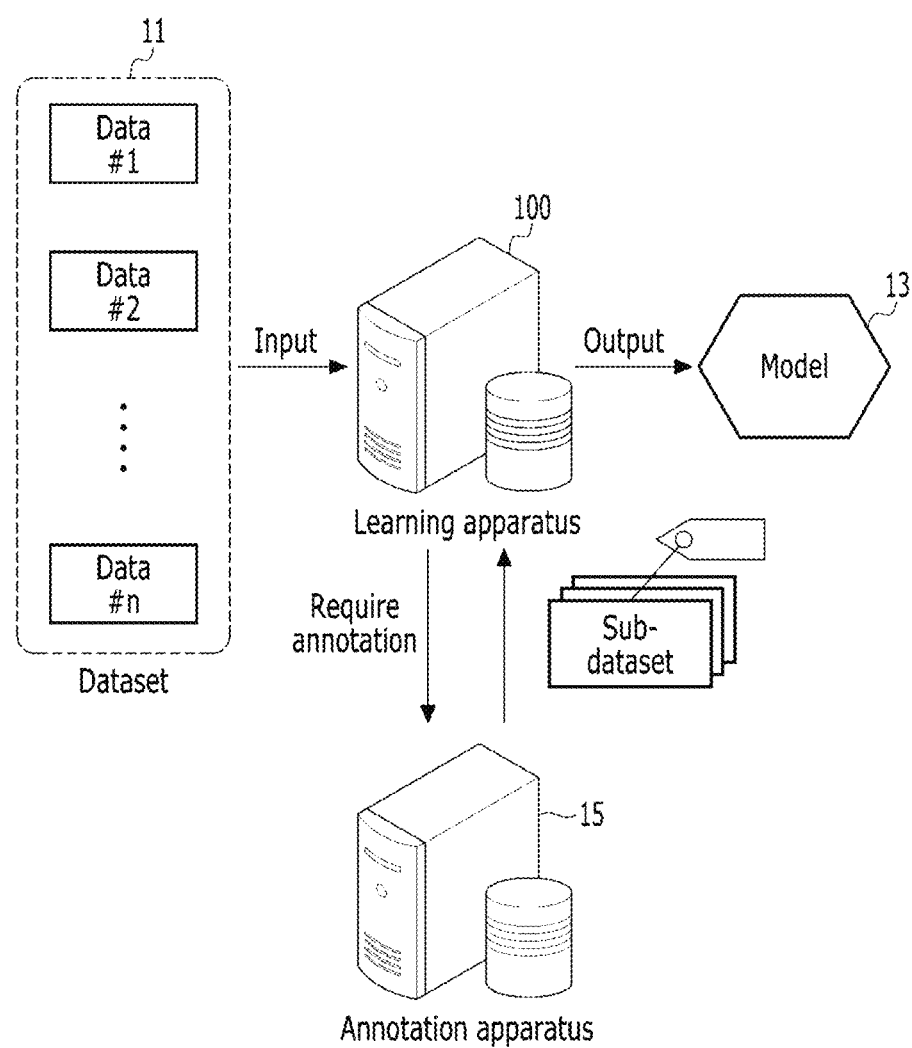

FIG. 3 and FIG. 4 are schematic diagrams for schematically explaining an operation and an input/output of a machine learning apparatus 100 according to some embodiments of the present disclosure.

As shown in FIG. 3, the machine learning apparatus 100 is a computing device that may perform a machine learning method according to various embodiments of the present disclosure. Here, the computing device may be a notebook computer, a desktop computer, a laptop computer, and the like, but is not limited thereto, and may include several devices having a computing function. An example of the computing device will be described with reference to FIG. 22. Hereinafter, for convenience of description, the machine learning apparatus 100 will be abbreviated as a learning apparatus 100.

Although FIG. 3 illustrates that the learning apparatus 100 is implemented as one physical computing device, in a real physical environment, a first function of the learning apparatus 100 may be implemented in a first computing device, and a second function may be implemented in a second computing device. In addition, a predetermined function of the learning apparatus 100 may be implemented to be performed through a distributed/parallel process in a plurality of computing devices (or processors).

As shown in FIG. 3, the learning apparatus 100 may receive a dataset 11 to which label information is not given, and construct a target model 13 for performing a target task by machine-learning it. In this case, the learning apparatus 100 may select a data sample group (that is, a sub-dataset) corresponding to some of the dataset 11, and obtain label information on the sub-dataset. The learning apparatus 100 may perform learning based on the obtained label information. In addition, this learning process may be repeated until the target performance of the target model 13 is satisfied. In the following description, when the data sample group corresponds to some of all the dataset, the terms "data sample group" and "sub-dataset" may be interchangeably used.

In some embodiments, as shown in FIG. 4, the learning apparatus 100 may send a request of an annotation job for the selected sub-dataset to an annotation apparatus 15. The learning apparatus 100 may obtain an annotation result (that is, label information) from the annotation apparatus 15. Here, the annotation apparatus 15 may be a computing device used by an annotator, and may be a device on which an annotation tool is installed. That is, the annotator may provide label information on a requested data sample group by using the annotation tool.

As described above, the annotation job must be manually performed by the annotator, which requires a lot of time and human costs. Therefore, to minimize annotation costs, it is important to accurately select a data sample group that is effective for learning.

In some embodiments, the learning apparatus 100 may select at least one data sample from the dataset 11 based on a miss-prediction probability of the target model 13. According to the present embodiment, data samples are not selected based on an entropy value (that is, the uncertainty) of the target model 13 and data samples on which prediction of the target model 13 is likely to be incorrect may be selected as annotation targets. By doing so, the accuracy of data selection may be improved, and a learning speed of the target model 13 may be improved. Further, the performance of target model 13 quickly converges to a target performance, so that the annotation cost may be greatly reduced. Detailed description of the present embodiment will be described in detail with reference to the following drawings.

In some embodiments, the learning apparatus 100 and the annotation apparatus 15 may communicate over a network. Here, the network may be implemented with various types of wired/wireless network such as a local area network (LAN), a wide area network (WAN), a mobile radio communication network, a wireless broadband Internet (WiBro), and the like.

The operation and input/output of the learning apparatus 100 according to some embodiments of the present disclosure have been described with reference to FIG. 3 and FIG. 4 so far. Hereinafter, a configuration and operation of the learning apparatus 100 will be described with reference to FIG. 5 to FIG. 7.

Figure 5:
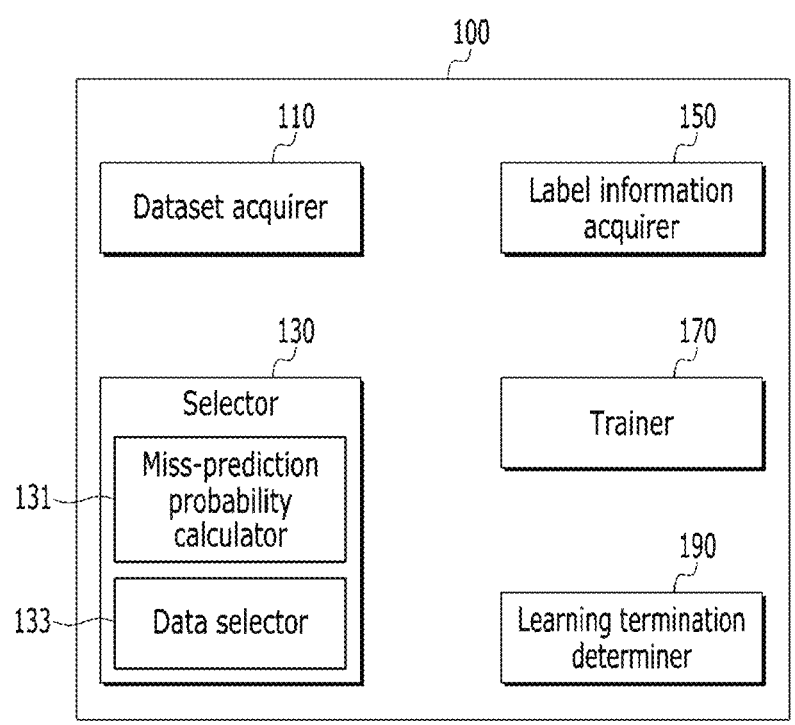
FIG. 5 and FIG. 6 are exemplary block diagrams of a machine learning apparatus according to some embodiments of the present disclosure.
Figure 6:
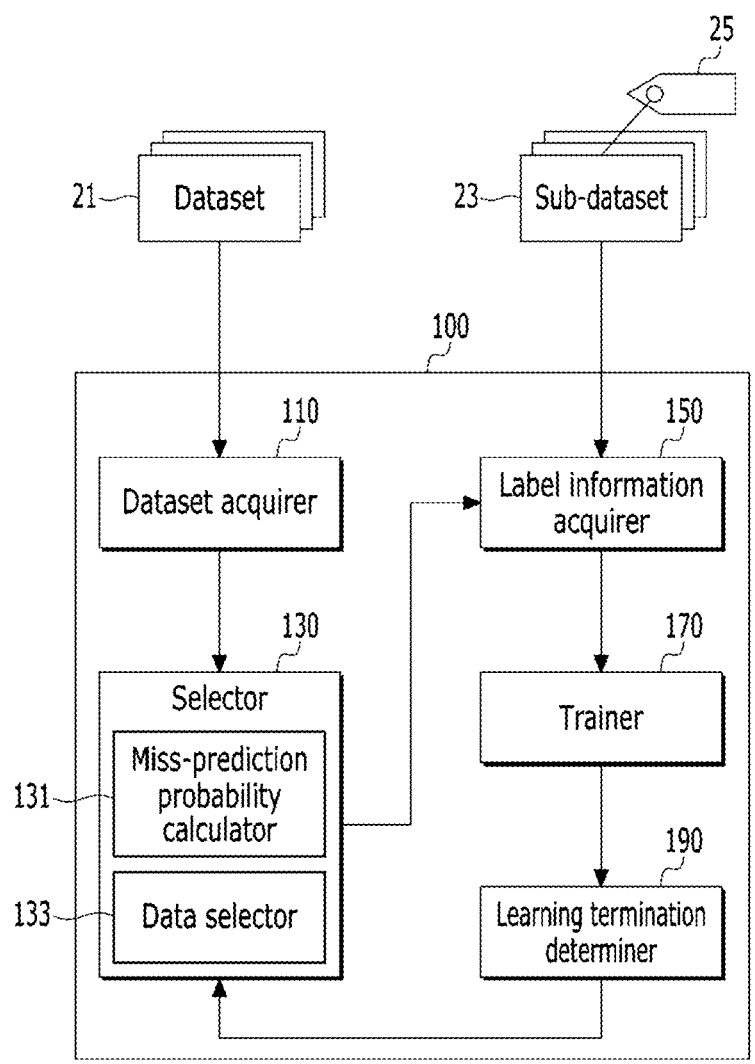

FIG. 5 and FIG. 6 are block diagrams of a learning apparatus 100 according to some embodiments of the present disclosure. Particularly, FIG. 6 further illustrates operational flow of the learning apparatus 100.

Referring to FIG. 5 and FIG. 6, the learning apparatus 100 may include a dataset acquirer 110, a selector 130, a label information acquirer 150, a trainer 170, and a learning termination determiner 190. However, in FIG. 5 and FIG. 6, only constituent elements related to the embodiment of the present disclosure are shown. Accordingly, those skilled in the art may understand that other general constituent elements may be further included in addition to the constituent elements shown in FIG. 5 and FIG. 6. In addition, respective constituent elements of the learning apparatus 100 shown in FIG. 5 and FIG. 6 represents functionally divided functional elements, and it should note that they may be implemented in such a way that a plurality of constituent elements are integrated with each other in an actual physical environment. Hereinafter, each constituent element will be described.

The dataset acquirer 110 acquires a dataset 21 to be used for training a target model. The training dataset 21 may be configured of a plurality of data samples to which label information is not given, but it is also possible to include some data samples to which label information is given.

Next, the selector 130 selects a data sample to be annotated from the training dataset 21. The selector 130 may include a miss-prediction probability calculator 131 and a data selector 133.

The miss-prediction probability calculator 131 calculates a miss-prediction probability on each of the plurality of data samples included in the training dataset 21. In this case, the plurality of data samples may be all or some (for example, unlearned data samples) included in the training dataset 21.

In order to calculate a miss-prediction probability of the target model, the miss-prediction probability calculator 131 may use a predetermined machine learning model. In order to exclude a redundant description, the description of the machine learning model will be described later with reference to FIG. 8 and drawings following FIG. 8.

Next, the data selector 133 selects at least one data sample based on the miss-prediction probability. Specifically, the data selector 133 selects a data sample (that is, a data sample that the target model is likely to be considerably wrong) with a miss-prediction probability having a threshold or more among the plurality of data samples. The selected data sample may form a sub-dataset 23.

In this case, the number of the selected data samples may be a predetermined fixed value or a variation value that varies depending on a situation. For example, the number may be varied based on a difference between a current performance and a target performance of the target model, a number of unlearned data samples, an annotation cost, and the like. More specifically, the number of the selected data samples may be varied to be small as the difference between the current performance and the target performance of the target model becomes smaller. In another example, the number of the selected data samples may be varied to be small as the number of unlearned data samples becomes smaller or the annotation cost becomes larger.

Next, the label information acquirer 150 acquires label information 25 of the selected sub-dataset 23 as a result of the annotation job. For example, the label information acquirer 150 may obtain the label information 25 for the sub-dataset 23 from the annotation apparatus 15.

Next, the trainer 170 performs learning on the target model based on the sub-dataset 23 having the label information 25. For example, when the target model is a neural network-based model, the trainer 170 may perform learning by updating a weight of the target model through error backpropagation, but the technical scope of the present disclosure is not limited thereto.

Next, the learning termination determiner 190 determines whether to finish the learning on the target model based on a specified learning termination condition. The learning termination condition may be changed depending on embodiments. For example, the learning termination condition may be set based on the number of learning repetitions when the performance of the target model reaches the target performance, but the technical scope of the present disclosure is not limited thereto.

Specifically, the learning termination determiner 190 may terminate learning in response to determining that the specified learning termination condition is satisfied. In a case opposite thereto, the learning may be continuously performed. When the learning is continuously performed, the selector 130, the label information acquirer 150, and the trainer 170 may perform the above-described process again. An example of a process in which the learning is repeated is shown in FIG. 7.

Figure 7:
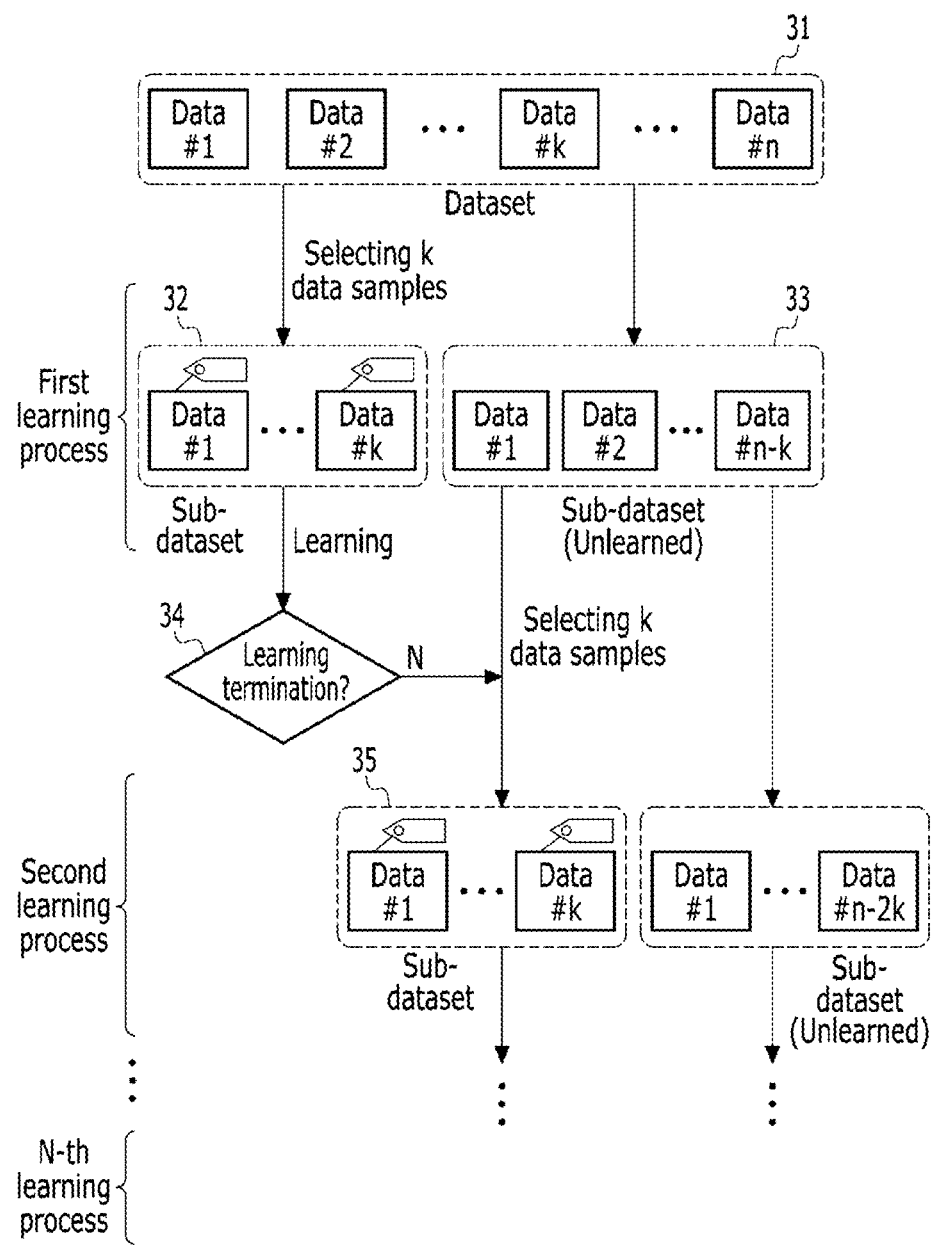
FIG. 7 is an exemplary diagram for explaining a learning operation of a machine learning apparatus according to some embodiments of the present disclosure.

As shown in FIG. 7, during the first learning process, a first annotation job and a first learning may be performed on a first sub-dataset 32 selected from a training dataset 31. In addition, before selecting the first sub-dataset 32, in the first learning process, a miss-prediction probability calculation model may be constructed and updated through learning. A description of the miss-prediction probability calculation model will be described later with reference to FIG. 8 to FIG. 11. When the first learning is completed, a determination 34 on whether the learning terminates is performed, and a second learning process may be started according to a learning continuation determination.

During the second learning process, a second annotation job and second learning may be performed on a second sub-dataset 35 selected from an unlearned sub-dataset 33. According to some other embodiments, a data sample for the second annotation may be selected from all the datasets 31 rather than the unlearned sub-dataset 33. In addition, before selecting the second sub-dataset 35, even in the second learning process, the model for calculating the miss-prediction probability may be updated through learning. Through this, a data sample that the target model is likely to be a wrong may be more accurately selected in the second learning process.

In some embodiments, the first sub-dataset 32 selected in the first learning process may be learned based on a first weight, and the second sub-dataset 35 selected in the second learning process may be learned based on a second weight. In this case, the second weight may be set to be a value greater than the first weight. Here, learning based on the weight means learning with a stronger or weaker intensity, depending on a value of the weight. In addition, learning the target model with a stronger intensity means learning having a greater effect on weight adjustment for the target model, and in this case, any implemented methods therefor may be possible. For example, the learning intensity may be increased by increasing a prediction error, but the technical scope of the present disclosure is not limited thereto. Since the prediction of the first learned target model is likely to be incorrect to the second sub-dataset 35, the second sub-dataset 35 may be a more important data sample (that is, more effective samples for learning) than the first sub-dataset 32. Therefore, according to the present embodiment, the learning effect of the target model may be further improved, and the performance of the target model may quickly reach the target performance. In addition, the annotation cost may be further reduced.

In the above manner, the learning may be repeatedly performed until the learning termination condition is satisfied. Additional descriptions of constituent elements 110 to 190 of the learning apparatus 100 will be further given with reference to FIG. 8 and drawings following FIG. 8.

For reference, it should be noted that not all constituent elements illustrated in FIG. 5 and FIG. 6 are essential constituent elements of the learning apparatus 100. That is, the learning apparatus 100 according to some other embodiments of the present disclosure may be implemented with some of the constituent elements shown in FIG. 5 and FIG. 6.

Each constituent element of FIG. 5 and FIG. 6 may mean software or hardware such as a field programmable gate array (FPGA) or an application-specific integrated circuit (ASIC). However, the above-mentioned constituent elements are not limited to software or hardware, and may be configured to be in an addressable storage medium or may be configured to execute one or more processors. Functions provided in the above-mentioned constituent elements may be implemented by more detailed constituent elements, or may be implemented as one constituent element that performs a specific function by combining a plurality of constituent elements.

The configuration and operation of the learning apparatus 100 according to some embodiments of the present disclosure have thus far been described with reference to FIG. 5 to FIG. 8. Hereinafter, a machine learning method according to some embodiments of the present disclosure will be described in detail with reference to FIG. 8 to FIG. 16.

Each step of the machine learning method may be performed by the computing device. In other words, each step of the machine learning method may be implemented by one or more instructions executed by a processor of the computing device. All steps included in the machine learning method may be executed by one physical computing device, but the first steps of the method may performed by the first computing device and the second steps of the method may be performed by the second computing devices. In the following description, it is assumed that each step of the machine learning method is performed by the learning apparatus 100. However, for convenience of description, description of an operation subject of each step included in the machine learning method may be omitted.

Figure 8:
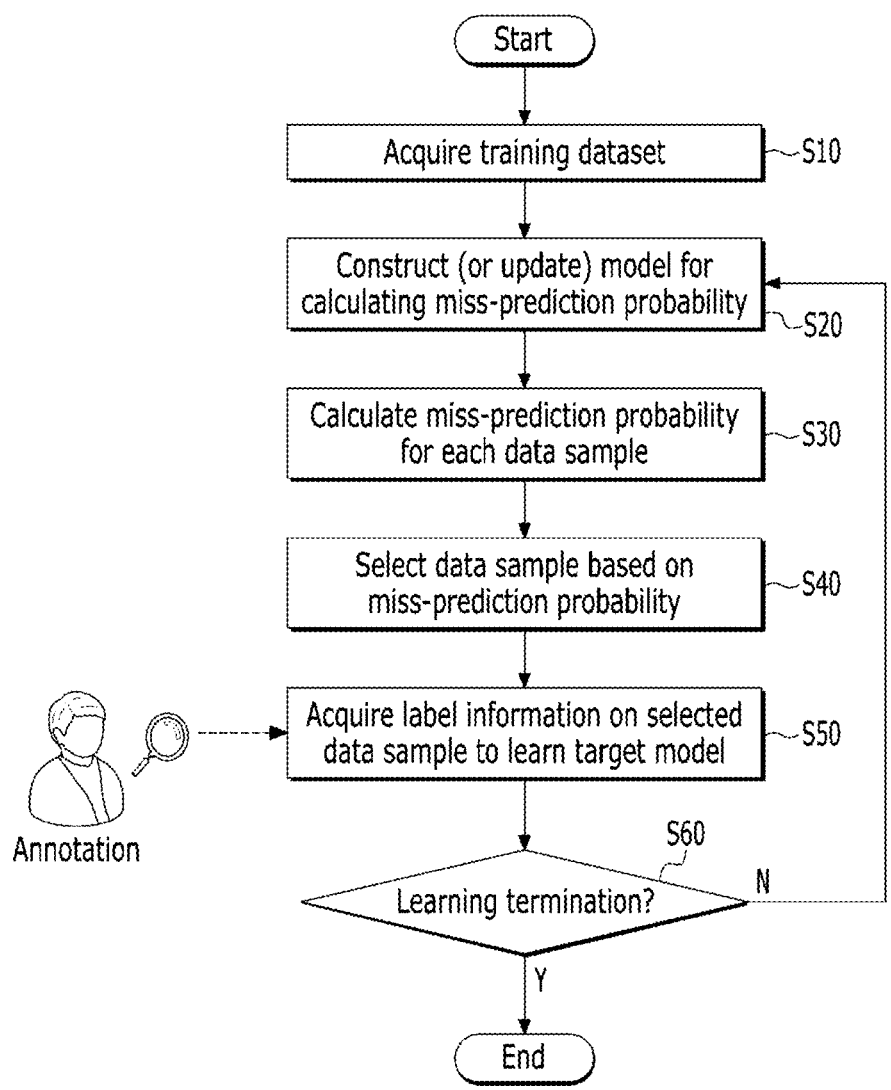
FIG. 8 is an exemplary flowchart of a machine learning method according to some embodiments of the present disclosure.

FIG. 8 is an exemplary flowchart of a machine learning method according to some embodiments of the present disclosure. However, this is only a preferred embodiment for achieving an object of the present disclosure, and some steps may be added or deleted as necessary.

As shown in FIG. 8, the machine learning method begins with step S10 of acquiring the training dataset of the target model. The training dataset includes a plurality of data samples to which no label information is given.

In step S20, the learning apparatus 100 constructs or updates a model for calculating a miss-prediction probability of the target model. The method of constructing the miss-prediction probability calculation model (hereinafter, abbreviated as "calculation model") may vary depending on embodiments. Hereinafter, some embodiments for constructing the calculation model will be described with reference to FIG. 9 to FIG. 11.

Figure 9:
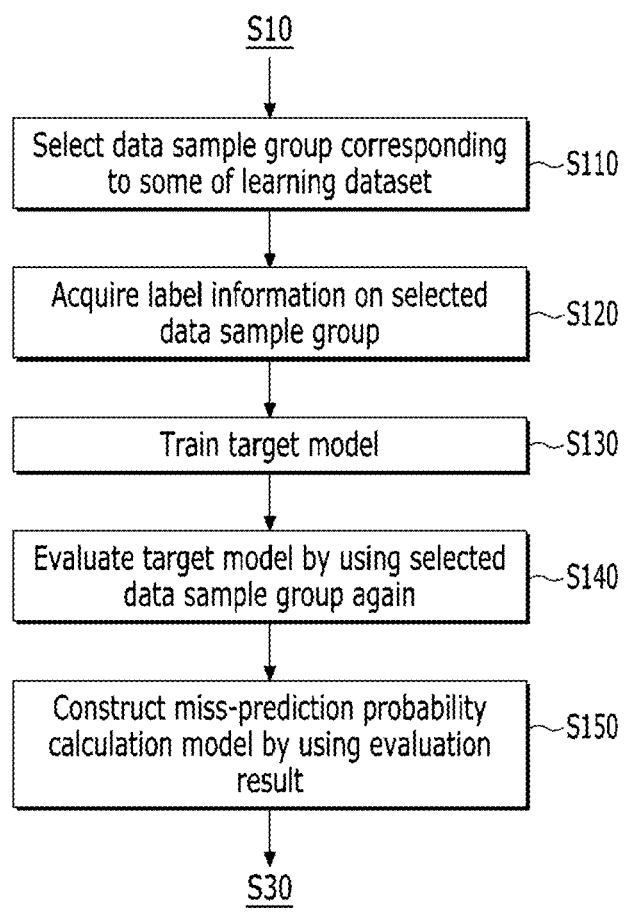
FIG. 9 and FIG. 10 are diagrams for explaining a method for constructing a miss-prediction probability calculation model according to a first embodiment of the present disclosure.

FIG. 9 is an exemplary flowchart of a method for constructing a miss-prediction probability calculation model according to a first embodiment of the present disclosure.

As shown in FIG. 9, the first embodiment begins with step S110 of selecting a data sample group corresponding to some of the training dataset.

In steps S120 and S130, the learning apparatus 100 acquires label information on the selected data sample group, and trains the target model using the label information.

In step S140, the learning apparatus 100 evaluates the target model by again using the selected data sample group. For example, the learning apparatus 100 may obtain a prediction result by inputting the first data sample into the target model, and evaluate the target model by comparing the prediction result with label information of the first data sample.

In step S150, the learning apparatus 100 constructs the miss-prediction probability calculation model by using the evaluation result. More specifically, the learning apparatus 100 may tag the evaluation result with the label information of the corresponding data sample, and construct the calculation model by learning the data sample with the label information. In order to provide more convenience of understanding, the step S150 will be additionally described in detail with reference to FIG. 10.

Figure 10:
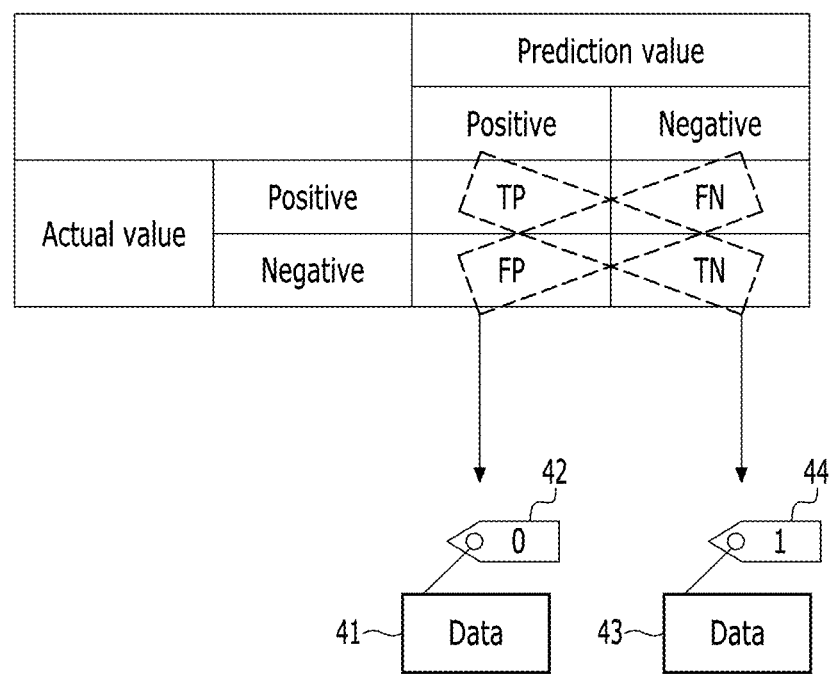

FIG. 10 illustrates a confusion matrix, and when the target model is a model performing a classification task, the evaluation result may correspond to a specific cell in the confusion matrix. As shown in FIG. 10, a data sample 41 of which an evaluation result is a false positive (FP) or a false negative (FN) is tagged with a label value 42 of a first value (e.g., 1), and a data sample 43 of which the evaluation result is true positive (TP) or true negative (TN) is tagged with a label value 44 of a second value (e.g., 0). In other words, when the prediction of the target model matches the correct answer, "1" may be tagged, and when the prediction of the target model does not match the correct answer, "0" may be tagged.

After learning the data samples 41 and 43 and the label information as described above, the calculation model outputs a high confidence score when data similar to the data correctly predicted by the target model is inputted. In addition, otherwise, the calculation model outputs a low confidence score. Accordingly, the calculation model may accurately calculate the miss-prediction probability of the target model for the inputted data.

On the other hand, it should be noted that FIG. 10 only shows some examples of tagging label information. According to some other embodiments of the present disclosure, the learning apparatus 100 may tag the prediction error of the data sample with label information. Here, the prediction error means a difference between a prediction value (that is, confidence score) and an actual value (that is, correct answer information).

In addition, according to some other embodiments of the present disclosure, the learning apparatus 100 tags the first value (e.g., 0) when the prediction error of the data sample is greater than or equal to a threshold, and when the prediction error is less than the threshold, the second value (e.g., 1) may also be tagged with the label information.

Figure 11:
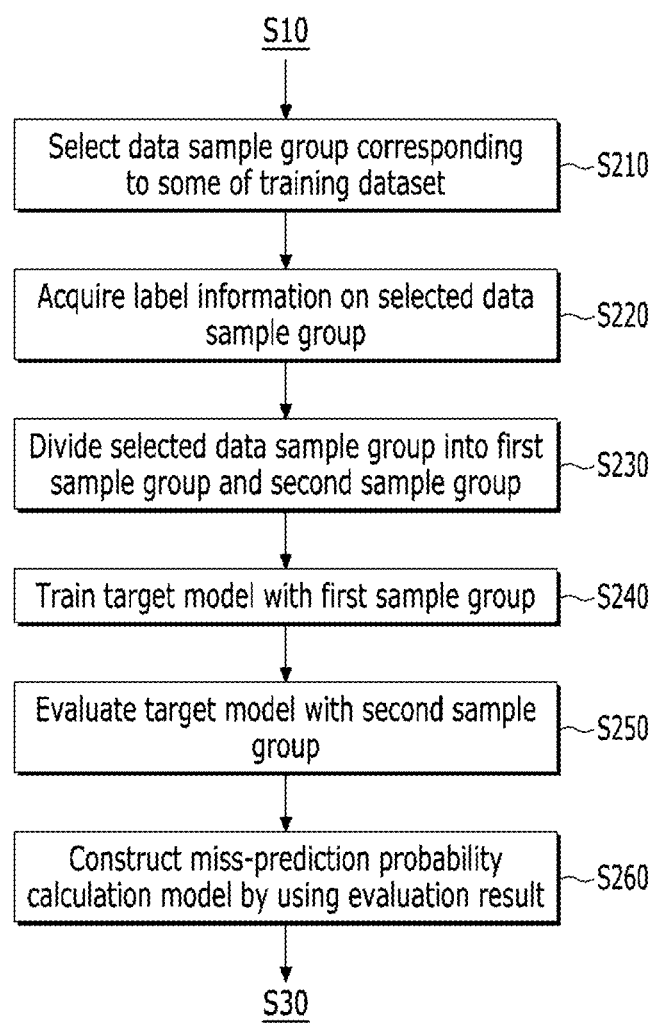
FIG. 11 is a diagram for explaining a method for constructing a miss-prediction probability calculation model according to a second embodiment of the present disclosure.

FIG. 11 is an exemplary flowchart of a method for constructing a miss-prediction probability calculation model according to a second embodiment of the present disclosure.

As shown in FIG. 11, an overall process of the second embodiment is similar to that of the first embodiment shown in FIG. 9. However, there is a difference between the first and second embodiments that, in the second embodiment, the selected data sample group is divided into a first sample group and a second sample group, and then the target model is learned with the first sample group, and the target model is evaluated with the second sample group (see S230 to S250).

That is, in the above-described first embodiment, the evaluation is performed by using the learned sample group, but the second embodiment differs from the first embodiment in that the target model is more accurately evaluated by distinguishing the learning and evaluation sample groups. According to some embodiments, the learning apparatus 100 may repeatedly perform the learning and evaluation by using a k-fold cross validation method. In this case, the evaluation result may be used as training data of the calculation model. The cross validation will be apparent to those skilled in the art, so a description thereof will be omitted. According to the present embodiment, as more evaluation data is secured, a more accurate calculation model may be constructed.

In addition, according to some embodiments, the learning apparatus 100 may generate a similar sample group from the evaluation sample group by using a data augmentation method, and construct a calculation model by further learning the generated sample group. Of course, a technical concept inherent in the present embodiment may be applied to the learning sample or the evaluation sample group of the first embodiment described above. The data augmentation method will be apparent to those skilled in the art, so a description thereof will be omitted.

Referring back to FIG. 8, description will be continued.

In step S30, the learning apparatus 100 calculates a miss-prediction probability for each data sample included in the training dataset by using the calculation model. For example, as shown in FIG. 12, the learning apparatus 100 inputs respective data samples 52 to 54 to the calculation model 51 to obtain confidence scores 55 to 57 of the calculation model, and it may calculate the miss-prediction probability based on the confidence scores 55 to 57.

Figure 12:
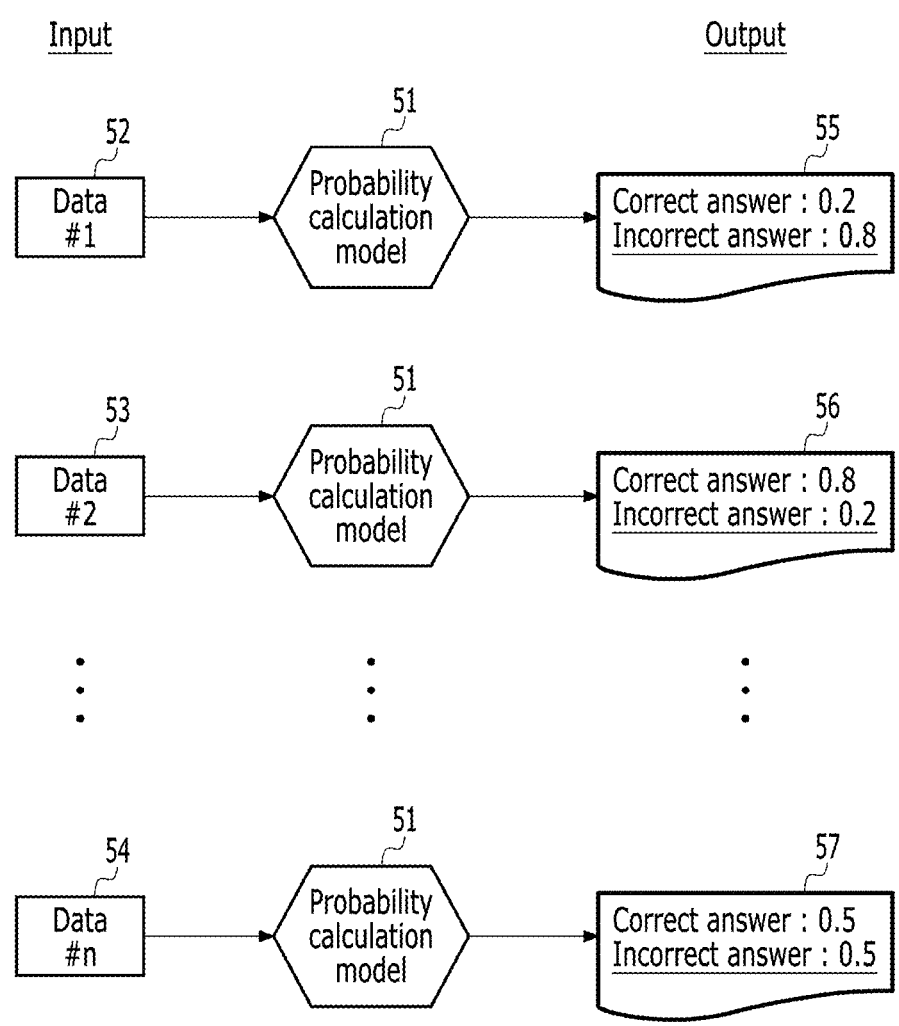
FIG. 12 is an exemplary diagram for explaining a miss-prediction probability-based data sample selecting (sampling) method according to some embodiments of the present disclosure.

In some embodiments, as shown in FIG. 12, in a case in which the calculation model 51 has been learned to output the confidence scores for the correct and incorrect answer classes (e.g., in a case in which when the answer is correct, it is learned with label 1, and when the answer is not correct, it is learned with label 0), the miss-prediction probability may be used for the confidence score (shown as underlined) of the incorrect answer class.

Referring back to FIG. 8, at step S40, the learning apparatus 100 selects at least one data sample from the training dataset based on the miss-prediction probability. For example, the learning apparatus 100 may select data samples having a miss-prediction probability greater than or equal to a threshold or upper k (wherein k is a natural number of 1 or more) data samples having a high miss-prediction probability.

In step S50, the learning apparatus 100 acquires label information on the selected data sample to train the target model. Since the selected data sample has a high probability that the prediction of the target model is an incorrect answer, the target model learned with the selected data sample may provide a quickly improved performance.

In step S60, the learning apparatus 100 determines whether the learning termination condition is satisfied. In response to determining that the learning termination condition is satisfied, the learning apparatus 100 may terminate the learning. In contrast, in response to determining that the learning termination condition is not satisfied, the learning apparatus 100 performs the above steps S20 to S50 again.

When the learning is repeated, in step S20, the learning apparatus 100 may again evaluate the learned target model, and learn the evaluation result to update the calculation model. By doing so, the miss-prediction probability may be accurately calculated as the learning is repeated.

In addition, in steps S30 and S40, the learning apparatus 100 may select a data sample to be annotated among the unlearned data samples instead of all the training datasets. Of course, according to some other embodiments, a data sample to be annotated may be selected from all the training datasets.

For reference, among the above-described steps S10 to S60, step S10 may be performed by the dataset acquirer 110, steps S20 and S30 may be performed by the miss-prediction probability calculator 131, and step S40 may be performed by the data selector 133. In addition, step S50 may be performed by the label information acquirer 150 and the trainer 170, and step S60 may be performed by the learning termination determiner 190.

In order to provide more convenience of understanding, the process of performing the above-described machine learning method will be described once again with reference to FIG. 13. Particularly, FIG. 13 shows an example in which a calculation model is constructed in accordance with the method shown in FIG. 9.

Figure 13:
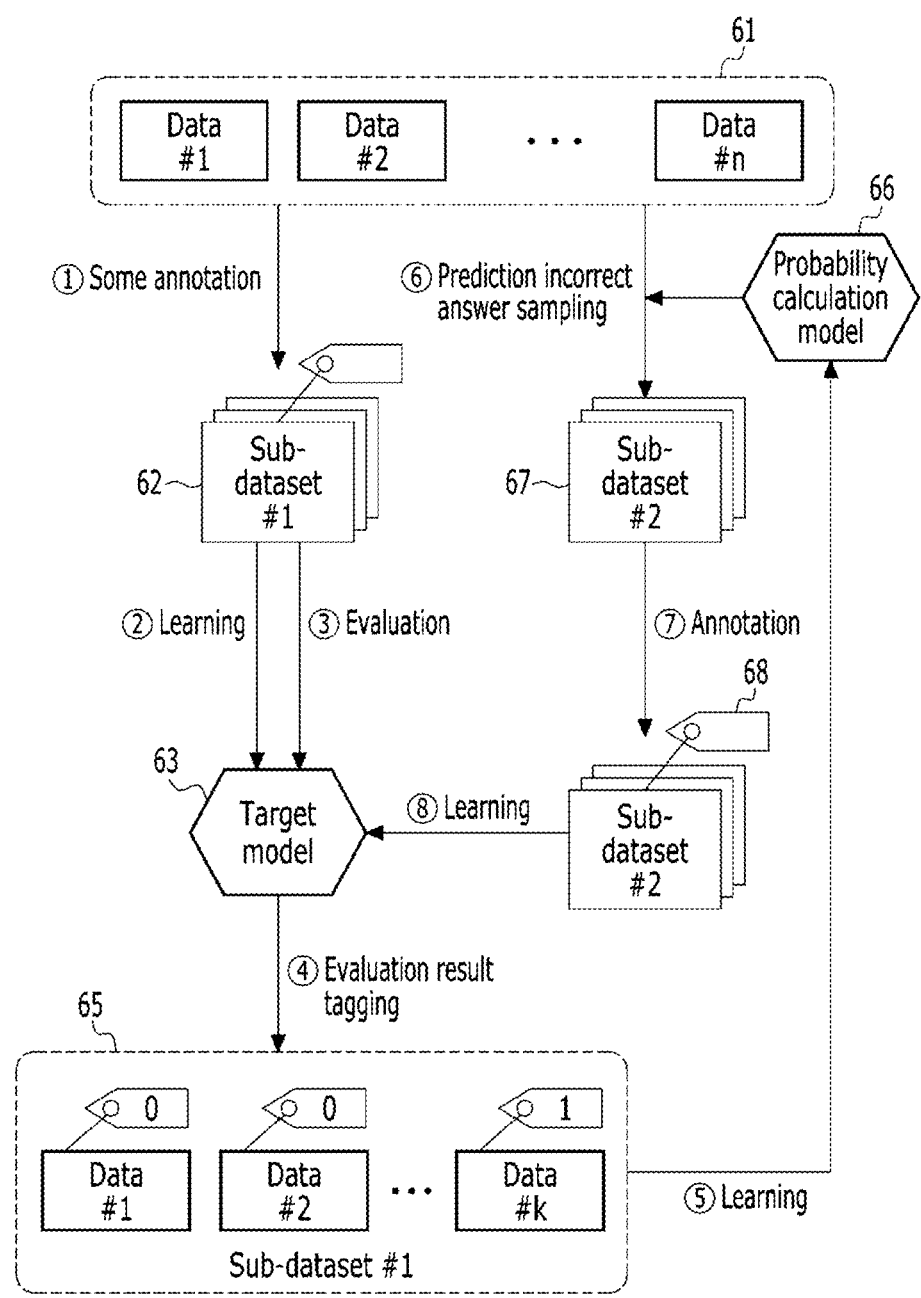
FIG. 13 is an exemplary diagram of a machine learning method according to some embodiments of the present disclosure.

As shown in FIG. 13, in the step ①, annotation on a sub-dataset 62 corresponding to some of a training dataset 61 for the target model is performed. Through the steps ② and ③, first learning and evaluation for a target model 63 are performed. In the step ④, the evaluation result is tagged to respective data samples 65 used for the evaluation to construct a calculation model 66. In addition, in the step ⑤, the calculation model 66 is constructed by learning the data samples 65 tagged with the evaluation result. In the step ⑥, a sub-dataset 67 having a prediction incorrect answer (that is, samples of which the prediction is likely to be incorrect) is selected based on the miss-prediction probability calculated by the calculation model 66. Next, in the step ⑦, the annotation is performed on the selected sub-dataset 67. In the step ⑧, second learning on a target model 63 is performed with label information 68 and the sub-dataset 67 obtained as the annotation result. As such, by intensively learning the predictive incorrect answer samples, the performance of the target model 63 may be sharply improved.

In some embodiments, when the second learning is performed, re-learning the sub-dataset 62 used for the first learning may be performed. That is, in order to maximally utilize the dataset given label information, iterative learning may be performed on the same dataset. Such technical concept may be variously utilized in the learning process. For example, the first data sets in which the label information is secured during the first learning process may be reused (that is, relearned) in the second learning process.

In some embodiments, the first data sample group 67 selected through the calculation model 66 and the second data sample group (e.g., 62) selected regardless of the calculation model 66 may be learned with different weights. For example, the first data sample group 67 may be learned with a first weight, and the second data sample group (e.g., 62) may be learned with a second weight. In this case, the first weight may be set to be a value greater than the second weight. By doing so, an important data sample may be learned with higher intensity, so that the performance of the target model 63 may be quickly improved.

In some embodiments, some data samples that are less learning effective may be excluded from the training dataset 61 to reduce annotation costs. In this case, a criterion for determining a data sample having a poor learning effect may vary according to embodiments.

In a first embodiment, data samples of which entropy values are less than the threshold (that is, data samples that the target model can certainly classify) may be excluded from the training dataset 61. More specifically, the class-specific confidence score for the first data sample may be calculated by the target model 63, and an entropy value may be calculated based on the class-specific confidence score. In this case, when the calculated entropy value is less than the threshold, the first data sample may be excluded from the training dataset 61. By doing so, the cost required for the annotation may be further reduced.

In a second embodiment, data samples of which miss-prediction probabilities are less than the threshold (that is, data samples that the target model can accurately classify) may be excluded from the training dataset 61. This is because the target model does not need to particularly learn the data sample that may already be correctly classified.

According to the embodiment described above, the process of excluding unnecessary data samples from the training dataset 1 may be performed at any time, such as when each learning process is completed, when a new learning process is started, or periodically.

The machine learning method according to some embodiments of the present disclosure has been described with reference to FIG. 8 to FIG. 13 so far. According to the method described above, a data sample to be annotated is selected based on a miss-prediction probability of a target model. In other words, the data sample is not selected based on uncertainty, but the data sample that the target model is likely to be wrong is selected. Unlike the uncertainty, the miss-prediction probability is not dependent on a confidence score of the target model, thus a data sample may be selected more accurately.

In addition, by intensively training the target model with data samples that are likely to be wrong, the learning effect can be improved. That is, performance of the target model can quickly reach target performance. Accordingly, computing and time costs required for learning can be greatly reduced, and a cost required for annotation can also be significantly reduced.

In addition, since active learning is performed based on a miss-prediction probability of the target model without depending on an entropy value, an application range of the active learning can be greatly expanded.

Hereinafter, some embodiments of the present disclosure designed to further improve the learning effect and further reduce the annotation cost will be described with reference to FIG. 14 and FIG. 15.

Figure 14:
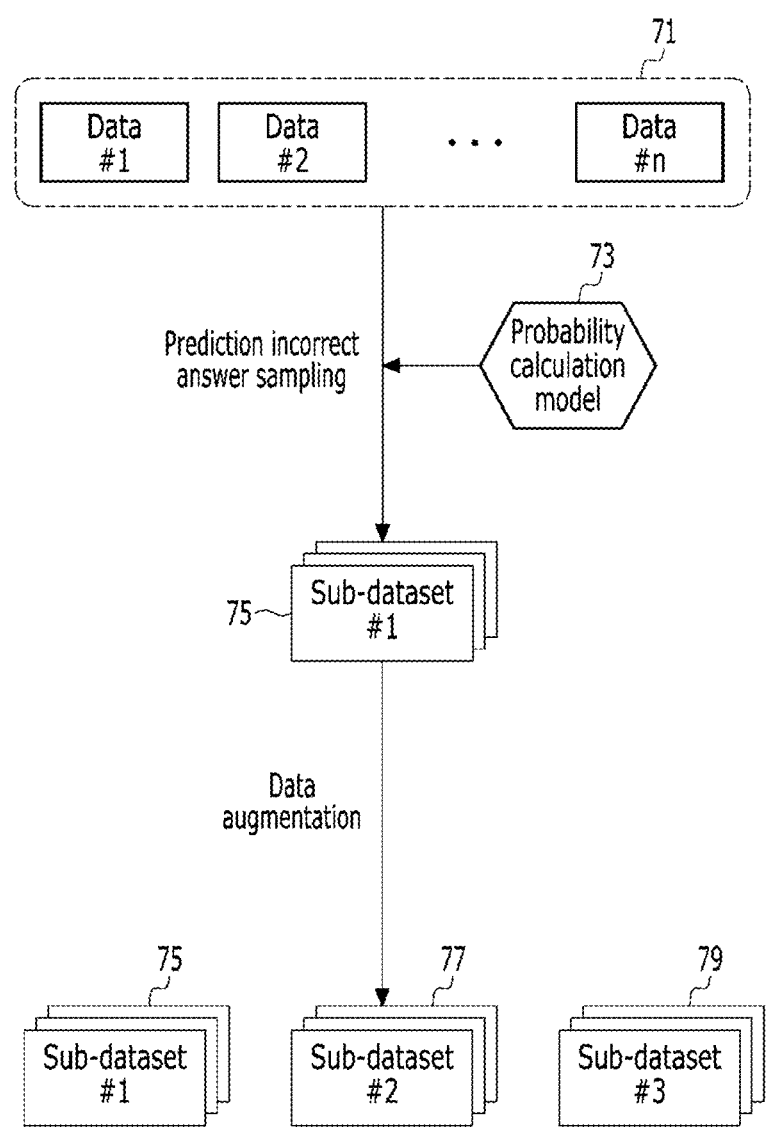
FIG. 14 is an exemplary diagram for explaining a method of improving a learning effect using a data augmentation method according to some embodiments of the present disclosure.

FIG. 14 is an exemplary diagram illustrating a machine learning method using a data augmentation method according to some embodiments of the present disclosure.

As shown in FIG. 14, the data augmentation method may be applied to a sub-dataset 75 selected from a training dataset 71 through a calculation model 73. This is because the selected sub-dataset 75 consists of data samples that are very effective for learning the target model.

More specifically, the learning apparatus 100 may augment the sub-dataset 75 to generate similar datasets 77 and 79, and further train the target model with the similar datasets 77 and 79. By doing so, the performance of the target model may be quickly improved, and the annotation cost may be reduced.

When the data sample has an image format, the data augmentation may be performed by image-cropping, image-rotating, image-flipping, image-resizing, color-jittering, or the like, but the technical scope of the present disclosure is not limited thereto.

In some embodiments, the sub-dataset 75 may be learned with the first weight, and the similar data sets 77 and 79 may be learned with the second weight. In this case, the first weight may be set to be a value greater than the second weight. That is, the original data set 75 may be more strongly learned, and the similar data sets 77 and 79 may be more weakly learned.

Figure 15:
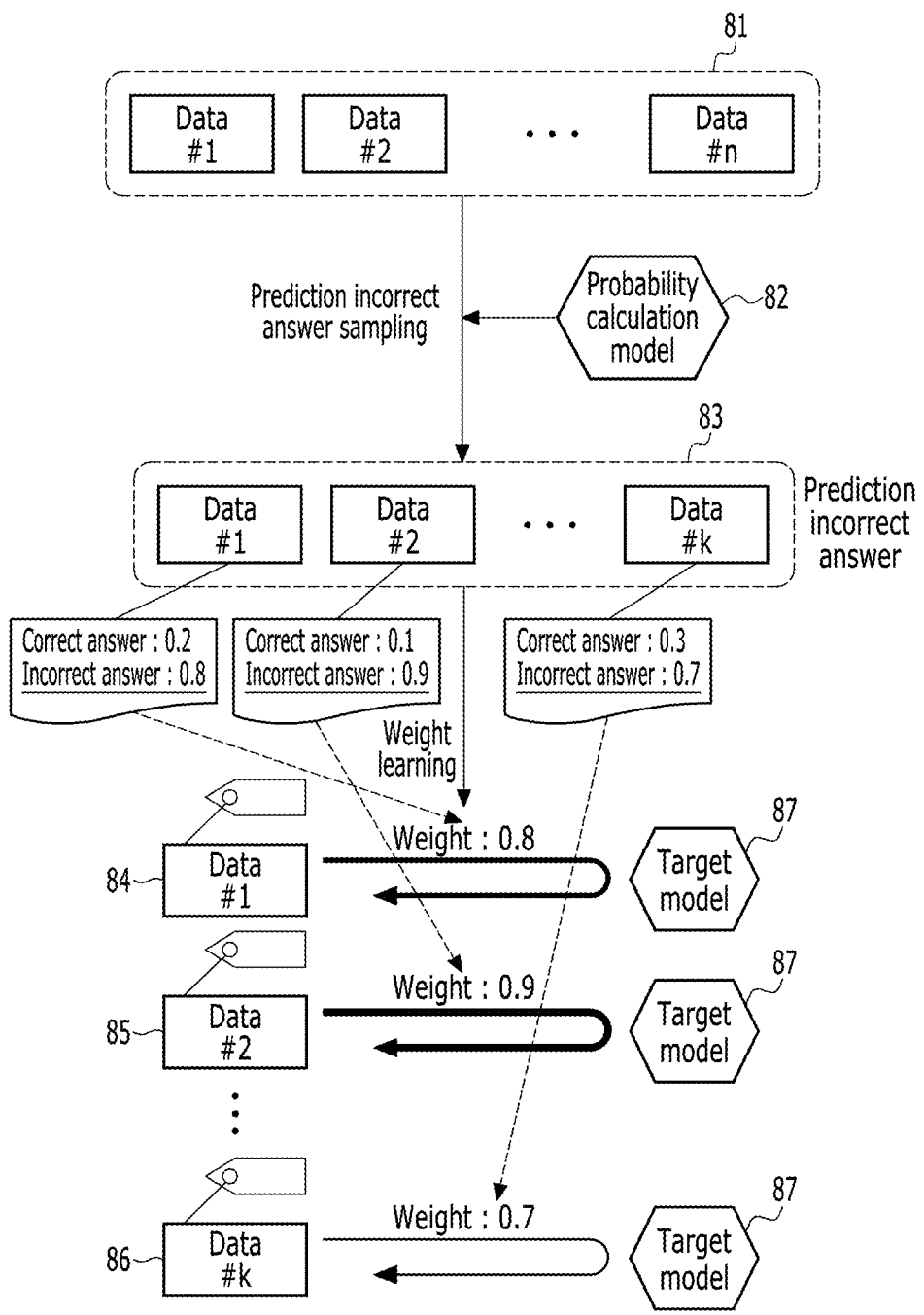
FIG. 15 is an exemplary diagram for explaining a method of improving a learning effect using a sample weight according to some embodiments of the present disclosure.

FIG. 15 is an exemplary diagram illustrating a machine learning method based on the sample weight according to some embodiments of the present disclosure.

As shown in FIG. 15, a differential sample weight may be set for respective data samples 84 to 86 of a sub-dataset 83 selected from a training dataset 81 through a calculation model 82. In addition, the learning may be performed on a target model 87 based on the sample weight. In FIG. 15, a thickness of an arrow indicates a learning intensity.

Here, a value of the sample weight may be determined based on the miss-prediction probability. For example, a higher sample weight may be applied to a data sample with a high miss-prediction probability. By doing so, a data sample of which the target model is likely to be wrong may be learned more strongly, and the learning effect thereof may be improved. Of course, a learning time and annotation cost may be reduced.

Some embodiments of the present disclosure designed to further enhance the learning effect have been described so far. Hereinafter, a machine learning method according to some other embodiments of the present disclosure will be described with reference to FIG. 16. For the sake of clarity of the present specification, a description of contents overlapping with the aforementioned machine learning method will be omitted.

Figure 16:
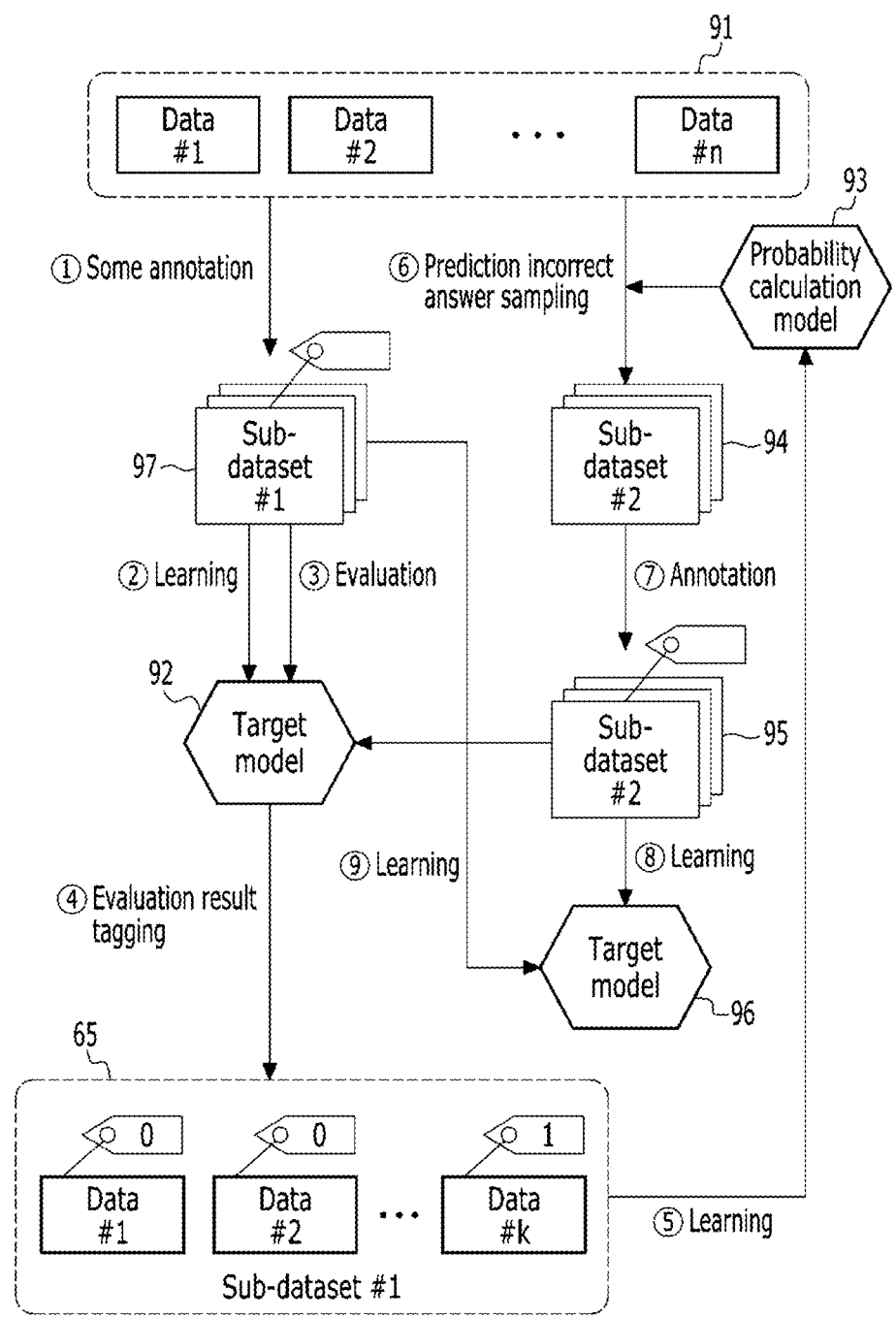
FIG. 16 is a flowchart for explaining a machine learning method according to other some embodiments of the present disclosure.

FIG. 16 is an exemplary diagram for explaining a machine learning method according to some other embodiments of the present disclosure.

As shown in FIG. 16, the overall process of the machine learning method according to the present embodiment is similar to that described with reference to FIG. 8. However, the present embodiment differs in that a target model 96 is newly constructed by using a sub-dataset 94 selected by a calculation model 93 and label information 95.

The reason for newly constructing the target model 96 with the selected sub-dataset 94 is to learn the sub-dataset 94 more strongly. More specifically, referring to the previous embodiment as shown in FIG. 13, the weight of the target model 63 is first adjusted through the first learning as shown in the step ② of FIG. 13, and then the weight of the target model 63 is adjusted through the second learning as shown in the step ⑧ of FIG. 13. Therefore, the weight of the target model is largely adjusted by the first learning in the step ②, thus the influence of the second learning in the step ⑧ with respect to the selected sub-dataset is minimized (e.g., the second learning has only a fine-tuning degree), and the performance of the target model may be degraded.

Therefore, in the present embodiment, the target model 96 in an initialization state is learned with the selected sub-dataset 94 in the step ⑧ of FIG. 16. In addition, in the step ⑨, the target model 96 is learned with an existing sub-dataset 97 that has not been selected by the calculation model 93 after the learning process in the step ⑧, so the selected sub-dataset 94 is learned more strongly. By doing so, a better target model may be constructed.

The machine learning methods according to various embodiments of present disclosure have been described with reference to FIG. 8 to FIG. 16 so far. Hereinafter, some application examples to which the machine learning method is applied to a medical domain will be described.

The medical domain does not have many training datasets to which the label information is given due to characteristics thereof, and the annotation job should be performed by a skilled specialist. For example, when tagging a site, type, name, etc. of a lesion in a radiographic image, the annotation job may only be performed by a radiologist. Therefore, more annotation cost is required compared with other domains, and the effect may be maximized when the technical concept of the present disclosure is utilized in the medical domain.

Figure 17:
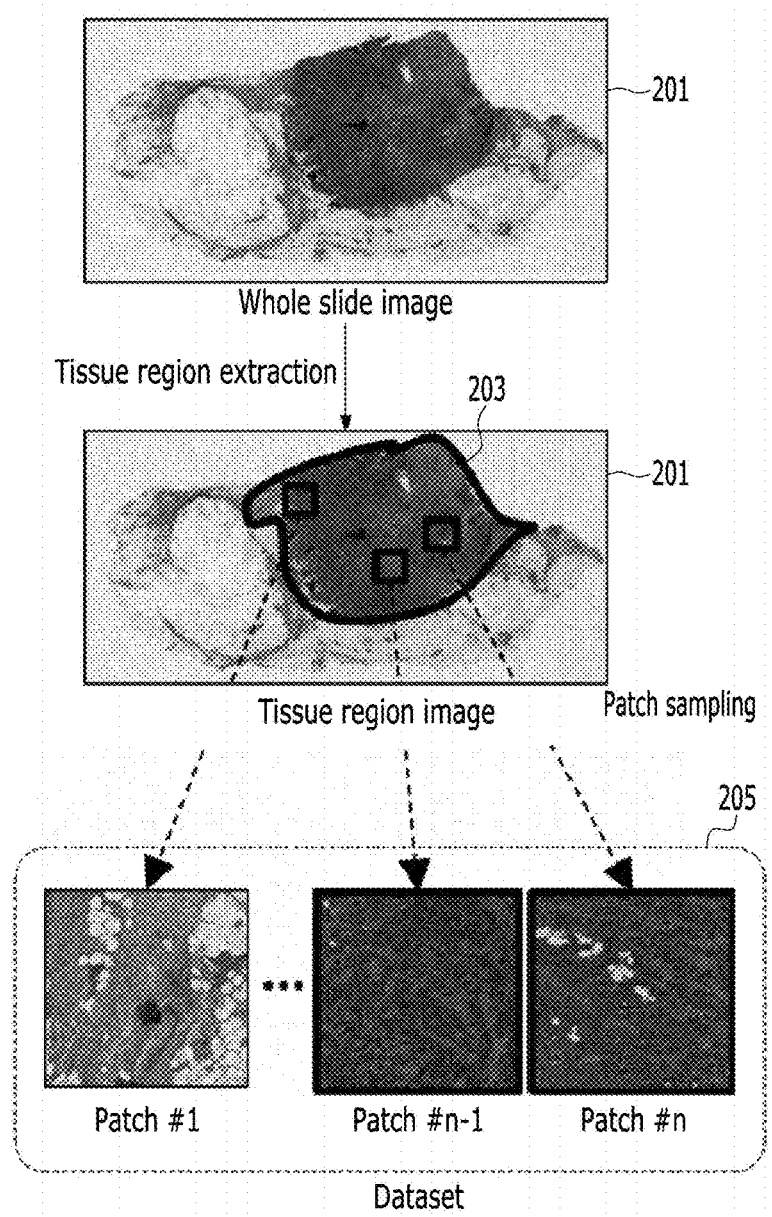
FIG. 17 to FIG. 19 are diagrams for explaining a patch sampling method based on a whole slide image according to some applications of the present disclosure.
Figure 18:
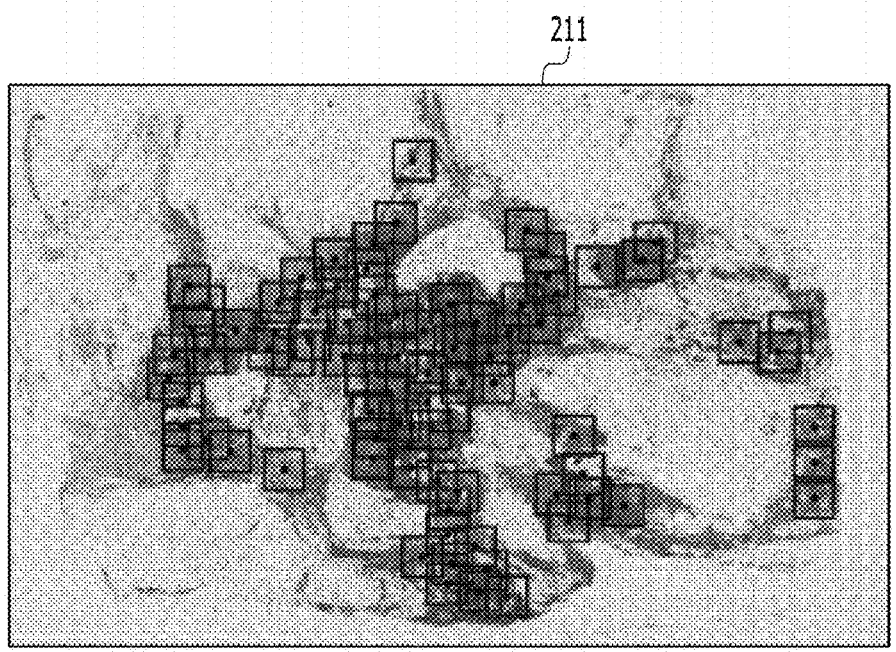
Figure 19:
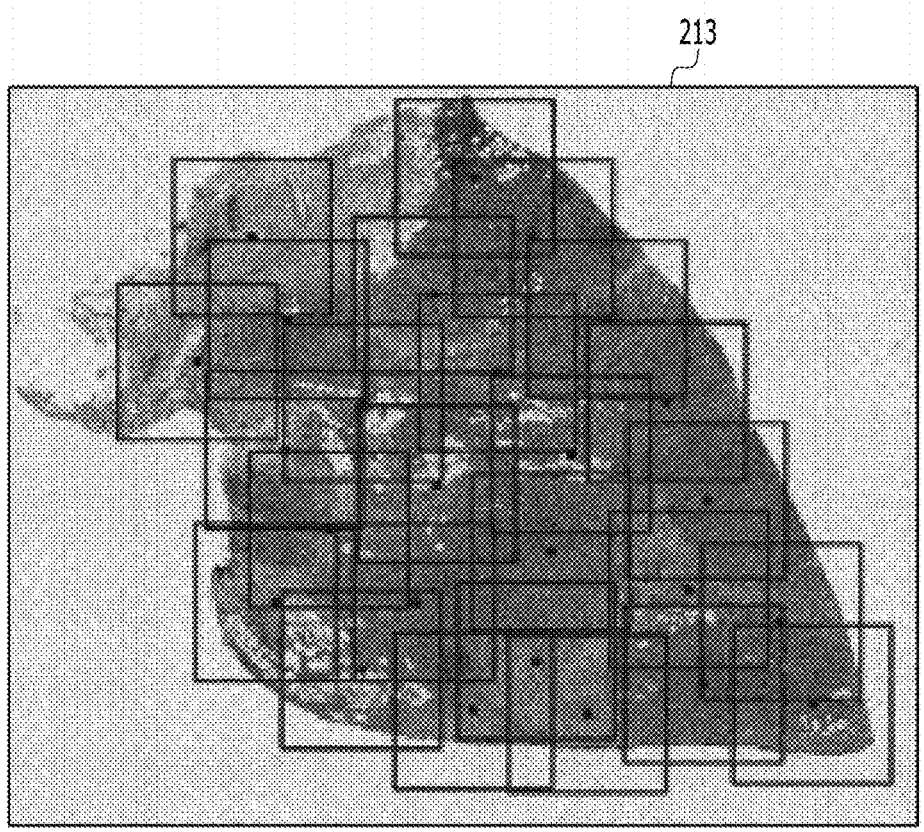

FIG. 17 to FIG. 19 respectively illustrate an example of generating a training dataset from a high resolution whole slide image of a captured tissue.

As shown in FIG. 17, when a tissue region 203 is extracted from a whole slide image 201, a training dataset 205 may be generated through patch sampling.

As in sampling examples 211 and 213 shown in FIG. 18 and FIG. 19, a size of the patch (or a size of the sampling region) may vary depending on the target model. In addition, respective patches may be sampled in a form of overlapping each other.

Figure 20:
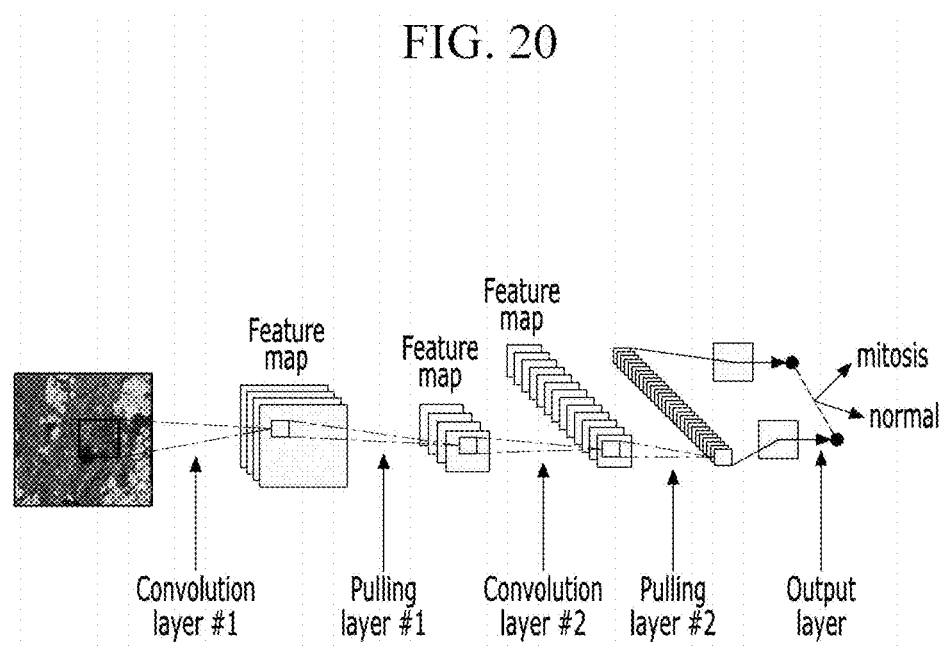
FIG. 20 is an exemplary diagram of a machine learning model according to some applications of the present disclosure.

For example, as shown in FIG. 20, when the target model is a model that classifies a mitosis and a normal cell by analyzing a cell-level image (e.g., a CNN-based classification model), a large number of small-sized patches may be sampled from one whole slide image (e.g., see FIG. 18). Thus, a large number of training datasets to which label information is not given may be generated.

As described above, the process of generating the training dataset through the patch sampling may be automatically performed through image analysis or processing techniques, but the annotation job on the training dataset should be manually performed by a specialist. Therefore, a significant annotation cost is inevitably consumed. In such a situation, to construct a target model, it may be utilized in the machine learning method according to the various embodiments of the present disclosure described above.

Figure 21:
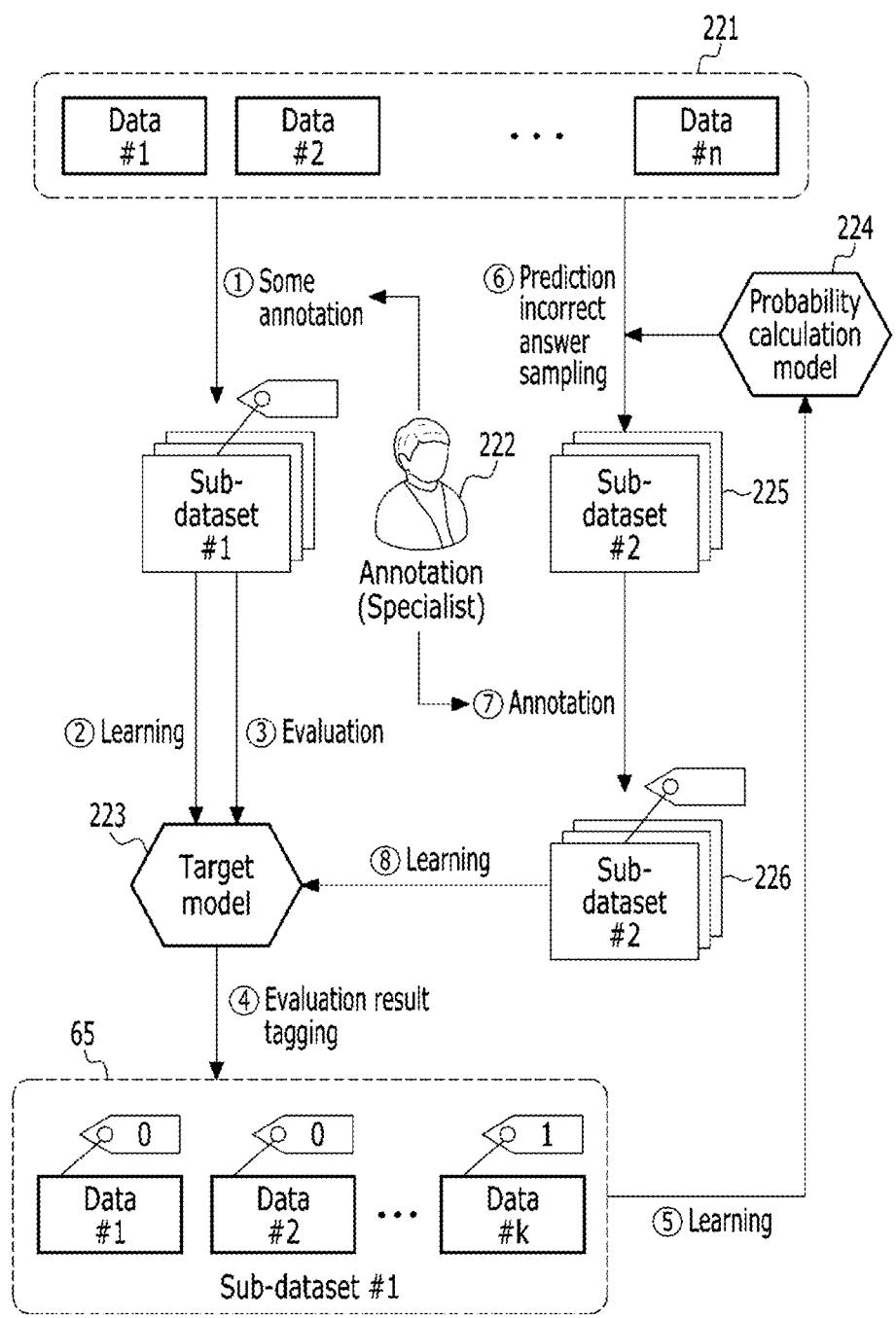
FIG. 21 is a diagram for explaining a machine learning method according to some applications of the present disclosure.

An example in which the machine learning method is utilized is shown in FIG. 21.

As shown in FIG. 21, a specialist 222 may serve as an annotator for a training dataset 221. A whole learning process thereof is the same as described above. First, an annotation is performed on the sub-dataset extracted from the training dataset 221 in the step ①. Through the steps ② and ③, learning and evaluation for a target model 223 is performed by using label information obtained by a result of the annotation. In addition, in the steps ④ and ⑤, a calculation model 224 is constructed by learning the evaluation result. In the step ⑥, a prediction incorrect answer set 225 is selected by using the miss-prediction probability calculated by the calculation model 224. Next, in the step ⑦, an annotation for the prediction incorrect answer set 225 may be performed by the annotator 222. In the step ⑧, the target model 223 may be updated by learning the annotation result.

The above-described process is repeatedly performed until the target model 223 satisfies the learning termination condition, and according to various embodiments described above, the learning termination condition of the target model 223 may be satisfied even though the training dataset 221 is not wholly learned. For example, the learning termination condition may be quickly satisfied through weighted learning based on a weight, a data augmentation method, and selective learning based on miss-prediction probability. Accordingly, intervention of the annotator 222 may be minimized while the learning is performed, and computing/time costs, an annotation cost, etc. required for the learning may be significantly reduced.

So far, the example in which the technical concept of the present disclosure is utilized in the medical domain has been briefly described with reference to FIG. 17 to FIG. 21. Hereinafter, a computing device 300 that may implement a device (e.g., the learning apparatus 100) according to various embodiments of the present disclosure will be described.

Figure 22:
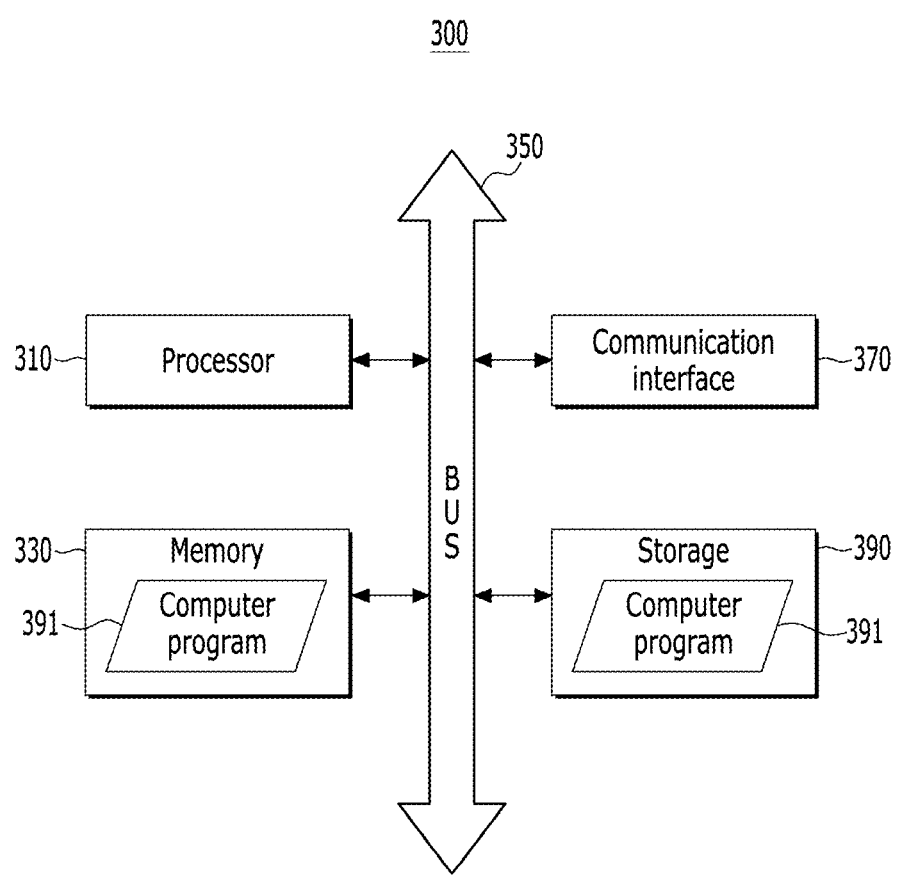
FIG. 22 is an exemplary hardware configuration diagram of an exemplary computing device that can implement devices according to various embodiments of the present disclosure.

FIG. 22 is an exemplary hardware configuration diagram of an exemplary computing device 300 that can implement devices according to various embodiments of the present disclosure.

As shown in FIG. 22, the computing device 300 may include one or more processors 310, a bus 350, a communication interface 370, a memory 330 that loads a computer program executed by the processor 310, and a storage 390 that stores the computer program 391. However, in FIG. 22, only constituent elements related to the embodiment of the present disclosure are shown. Accordingly, those skilled in the art may understand that other general constituent elements may be further included in addition to the constituent elements shown in FIG. 22.

The processor 310 controls an overall operation of each constituent element of the computing device 300. The processor 310 may be configured to include a central processing unit (CPU), a microprocessor unit (MPU), a microcontroller unit (MCU), a graphics processing unit (GPU), or any form of processor that is well known in the art. In addition, the processor 310 may perform an operation for at least one application or program for executing the method according to the embodiments of the present disclosure. The computing device 300 may include one or more processors.

The memory 330 stores various data, commands, and/or information. The memory 330 may load one or more programs 391 from the storage 390 to execute the method/operation according to various embodiments of the present disclosure. For example, when the computer program 391 for performing the machine learning method according to some embodiments of the present disclosure is loaded into the memory 330, as shown in FIG. 5, a module may be implemented on the memory 330. The memory 330 may be implemented as a volatile memory such as a RAM, but the technical scope of the present disclosure is not limited thereto.

The bus 350 provides communication between constituent elements of the computing device 300. The bus 350 may be implemented as various types of buses such as an address bus, a data bus, and a control bus.

The communication interface 370 supports wired and wireless Internet communication of the computing device 300. In addition, the communication interface 370 may support various communication methods other than internet communication. For this purpose, the communication interface 370 may include a communication module that is well known in the art of the present disclosure.

The storage 390 may non-temporarily store the one or more programs 391. The storage 390 may be a nonvolatile memory such as a read only memory (ROM), an erasable programmable ROM (EPROM), an electrically erasable programmable ROM (EEPROM), a flash memory, and the like, a hard disk, a detachable disk, or any form of a computer-readable recording medium that is well known in the art of the present disclosure.

When the computer program 391 is loaded into the memory 330, the computer program 391 may include one or more instructions that cause the processor 310 to perform the method according to various embodiments of the present disclosure. That is, the processor 310 may perform the methods according to various embodiments of the present disclosure by executing the one or more instructions.

For example, the computer program 391 may include one or more instructions that perform an operation for acquiring a training dataset of a first model including a plurality of data samples to which label information is not given, an operation for calculating a miss-prediction probability of the first model on the plurality of data samples, an operation for constructing a first data sample group by selecting at least one data sample from the plurality of data samples based on the calculated miss-prediction probability, an operation for acquiring first label information on the first data sample group, and an operation for performing first learning on the first model by using the first data sample group and the first label information. In this case, the learning apparatus 100 according to some embodiments of the present disclosure may be implemented through the computing device 300.

As another example, the computer program 391 may include one or more instructions that perform an operation for acquiring a training dataset including a plurality of data samples to which label information is not given, an operation for acquiring first label information on a first data sample group included in the training dataset and learning the first data sample group with the first label information to construct a first model, an operation for calculating a miss-prediction probability of the first model on the remaining data samples except the first data sample group in the training dataset, an operation for selecting at least one data sample from the remaining data samples based on the miss-prediction probability to configure a second data sample group, an operation for acquiring second label information on the second data sample group, and an operation for learning a second model of an initialized state with the second data sample group and the second label information. In this case, the learning apparatus 100 according to some other embodiments of the present disclosure may be implemented through the computing device 300.

So far, the exemplary computing device that may implement the device according to various embodiments of the present disclosure has been described with reference to FIG. 22.

The concepts of the disclosure described above with reference to FIG. 1 to FIG. 22 may be embodied as computer-readable code on a computer-readable medium. The computer-readable medium may be, for example, a removable recording medium (a CD, a DVD, a Blu-ray disc, a USB storage device, or a removable hard disk) or a fixed recording medium (a ROM, a RAM, or a computer-embedded hard disk). The computer program recorded on the computer-readable recording medium may be transmitted to another computing device via a network such as the Internet and installed in the computing device. Hence, the computer program can be used in the computing device.

The technical concept of the present disclosure is not necessarily limited to these embodiments, as all the elements configuring the embodiments of the present disclosure have been described as being combined or operated in combination. That is, within the scope of the present disclosure, all of the elements may be selectively operable in combination with one or more thereof.

Although operations are shown in a specific order in the drawings, it should not be understood that desired results can be obtained only when the operations are performed in the specific order or sequential order or when all of the operations are be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While the present disclosure has been particularly illustrated and described with reference to embodiments thereof, it will be understood by those skilled in the art that various changes in form and detail may be made therein without departing from the spirit and scope of the present disclosure as defined by the following claims. Therefore, it is to be understood that the above-described embodiments are for illustrative purposes only, and the scope of the present disclosure is not limited thereto. The protection range of the present disclosure should be construed by the claims below, and all technical ideas within an equivalent range thereof should be construed as being included within the scope of the present disclosure.

What is claimed is:

1. A machine learning method performed by a computing device, comprising:
    acquiring a training dataset of a target model including a plurality of data samples to which label information is not given;
    calculating a miss-prediction probability of the target model on each of the plurality of data samples using a probability calculation model trained for calculating the miss-prediction probability of the target model;
    making a first data sample group by selecting at least one data sample from the plurality of data samples based on the calculated miss-prediction probability;
    acquiring first label information on the first data sample group; and
    performing first learning on the target model by using the first data sample group and the first label information,
    wherein the target model is a machine learning model constructed to perform a target task through machine learning;
    wherein calculating the miss-prediction probability of the target model comprises:
    constructing the probability calculation model based on an evaluation about a predicted result of the target model; and
    calculating the miss-prediction probability on each of the plurality of data samples by using the probability calculation model, and
    wherein the constructing the probability calculation model comprises
    evaluating the predicted result of the target model for each of evaluation data samples given correct answer label information by comparing the predicted result and the correct answer label information for each of the evaluation data samples;
    tagging label information related to an evaluation result obtained by evaluating the predicted result for each of the evaluation data samples into each of the evaluation data samples; and training the probability calculation model using the evaluation data samples tagged with the label information related to the evaluation result.

2. The machine learning method of claim 1, wherein the first data sample group consists of a data sample having the calculated miss-prediction probability being greater than or equal to a threshold.

3. The machine learning method of claim 1, wherein the label information tagged to each evaluation data sample is a prediction error between the predicted result of the target model about the each evaluation data sample and correct answer label information of the each evaluation data sample.

4. The machine learning method of claim 1, wherein tagging the label information comprises:
in response to determining that the evaluation result is a false positive (FP) or a false negative (FN), tagging a first value as a label of an evaluation data sample corresponding to the FP or FN; and
in response to determining that the evaluation result is a true positive (TP) or a true negative (TN), tagging a second value as a label of an evaluation data sample corresponding to the TP or TN.

5. The machine learning method of claim 1, wherein the evaluation data samples are data samples used for initial training of the target model or data samples different from the data samples used for the initial training, among the training dataset.

6. The machine learning method of claim 1, wherein evaluating the predicted result of the target model comprises: acquiring second label information on a second data sample group corresponding to some of the training dataset;
initial training the target model by using at least some of the second data sample group;
evaluating a predicted result of the initial trained target model about the at least some of the second data sample group, by comparing the predicted result and the corresponding second label information.

7. The machine learning method of claim 6, wherein performing the first learning comprises
re-learning the second data sample group and the second label information.

8. The machine learning method of claim 7, wherein in performing first learning on the target model, the target model learns the first data sample group based on a first weight, and learns the second data sample group based on a second weight, and
wherein the first weight is greater than the second weight.

9. The machine learning method of claim 1, further comprising:
updating the probability calculation model by using an evaluation about a predicted result of the first learned target model;
calculating miss-prediction probability on unlearned data samples by using the probability calculation model;
making a second data sample group by selecting at least one data sample from the unlearned data samples based on the calculated miss-prediction probability;
acquiring second label information on the second data sample group; and
performing second learning on the first learned target model by using the second data sample group and the second label information.

10. The machine learning method of claim 9, wherein performing the second learning comprises:
determining whether a predetermined target performance condition is satisfied based on an evaluated result of the first learned target model; and
initiating the second learning in response to a dissatisfaction determination.

11. The machine learning method of claim 1, further comprising
determining data samples not used for the target model training among the training dataset,
wherein determining the data samples comprises:
calculating a class-specific confidence score on at least some data samples included in the training dataset through the target model;
calculating an entropy value on the at least some data samples based on the class-specific confidence score; and
excluding some data samples from the training dataset of the target model, in response to determining that the entropy value is less than a threshold.

12. The machine learning method of claim 1, wherein further comprising
excluding data samples having low miss-prediction probability than a threshold, from the training dataset of the target model.

13. The machine learning method of claim 1, wherein performing the first learning comprises:
providing sample weights to respective data samples included in the first data sample group based on the miss-prediction probability; and
training the target model with the data samples having the sample weights.

14. The machine learning method of claim 1, wherein performing the first learning comprises:
generating a second data sample group from the first data sample group by applying a data augmentation method; and
further learning the second data sample group to update the target model.

15. The machine learning method of claim 1, further comprising:
making a second data sample group by selecting at least one data sample from data samples not used in the first learning based on the miss-prediction probability of the first learned target model;
acquiring second label information on the second data sample group; and
performing second learning on the first learned target model by using the second data sample group and the second label information.

16. The machine learning method of claim 15, wherein in performing the second learning on the target model, the target model learns the first data sample group based on a first weight, and learns the second data sample group based on a second weight, and
wherein the first weight is greater than the second weight.

17. A machine learning method performed by a computing device, comprising:
acquiring a training dataset including a plurality of data samples to which label information is not given;
acquiring first label information on a first data sample group included in the training dataset, and training a first target model with the first data sample group given the first label information to construct the first target model;
calculating a miss-prediction probability of the first target model on remaining data samples except the first data sample group from the training dataset, using a probability calculation model trained for calculating the miss-prediction probability of the first target model;

making a second data sample group by selecting at least one data sample having high miss-prediction probability than a threshold, from the remaining data samples;
acquiring second label information on the second data sample group;
training a second target model of an initialization state with the second data sample group and the second label information; and
training the second target model with the first data sample group and the first label information,
wherein calculating the miss-prediction probability of the first target model comprises:
constructing the probability calculation model based on an evaluation about a predicted result of the first target model; and
calculating the miss-prediction probability on each of the remaining data samples by using the probability calculation model, and
wherein the constructing the probability calculation model comprises
evaluating the predicted result of the first target model for each of evaluation data samples given correct answer label information by comparing the predicted result and the correct answer label information for each of the evaluation data samples;
tagging label information related to an evaluation result obtained by evaluating the predicted result for each of the evaluation data samples into each of the evaluation data samples; and
training the probability calculation model using the evaluation data samples tagged with the label information related to the evaluation result.

18. A machine learning apparatus comprising:
a memory including one or more instructions; and
a processor, by executing the one or more instructions, that
acquires a training dataset of a target model including a plurality of data samples to which label information is not given,
calculates a miss-prediction probability of the target model on each of the plurality of data samples, using a probability calculation model trained for calculating the miss-prediction probability of the target model,
make a first data sample group by selecting at least one data sample from the plurality of data samples having high miss-prediction probability than a threshold,
acquires first label information on the first data sample group, and
performs first learning on the target model by using the first data sample group and the first label information,
wherein the target model is a machine learning model constructed to perform a target task through machine learning,
wherein calculating the miss-prediction probability of the target model comprises:
constructing the probability calculation model based on an evaluation about a predicted result of the target model; and
calculating the miss-prediction probability on each of the plurality of data samples by using the probability calculation model, and
wherein the constructing the probability calculation model comprises
evaluating the predicted result of the target model for each of evaluation data samples given correct answer label information by comparing the predicted result and the correct answer label information for each of the evaluation data samples;
tagging label information related to an evaluation result obtained by evaluating the predicted result for each of the evaluation data samples into each of the evaluation data samples; and
training the probability calculation model using the evaluation data samples tagged with the label information related to the evaluation result.

* * * * *